US012672121B2

(12) United States Patent
Chen et al.

(10) Patent No.: US 12,672,121 B2
(45) Date of Patent: Jun. 30, 2026

(54) METHOD, DEVICE, AND SYSTEM FOR TRANSMISSION RESOURCE OR TRANSMISSION PARAMETERS UPDATE IN WIRELESS NETWORKS

(71) Applicant: ZTE Corporation, Shenzhen (CN)

(72) Inventors: Mengzhu Chen, Shenzhen (CN); Yuzhou Hu, Shenzhen (CN); Hong Tang, Shenzhen (CN); Jiajun Xu, Shenzhen (CN); Qiujin Guo, Shenzhen (CN); Xiaoying Ma, Shenzhen (CN); Jun Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 346 days.

(21) Appl. No.: 18/345,063

(22) Filed: Jun. 30, 2023

(65) Prior Publication Data

US 2024/0121768 A1 Apr. 11, 2024

Related U.S. Application Data

(63) Continuation of application No. PCT/CN2021/072215, filed on Jan. 15, 2021.

(51) Int. Cl.
*H04L 5/00* (2006.01)
*H04L 1/00* (2006.01)
(Continued)

(52) U.S. Cl.
CPC ........ *H04W 72/11* (2023.01); *H04W 72/0446* (2013.01); *H04W 72/0453* (2013.01); *H04W 72/1268* (2013.01); *H04W 72/231* (2023.01)

(58) Field of Classification Search
None
See application file for complete search history.

(56) References Cited

U.S. PATENT DOCUMENTS 11,357,017 B2 * 6/2022 Bagheri ................ H04L 5/0051
11,405,874 B2 * 8/2022 Zhou ................... H04W 52/281
(Continued)

FOREIGN PATENT DOCUMENTS

CN 109565370 A 4/2019
WO WO 2021/003448 A1 1/2021

OTHER PUBLICATIONS

Extended European Search Report, Apr. 15, 2024, pp. 1-12, issued in European Application No. 219185758, European Patent Office, The Hague, The Netherlands.
(Continued)

*Primary Examiner* — Sithu Ko
(74) *Attorney, Agent, or Firm* — Crowell & Moring LLP

(57) ABSTRACT

This disclosure relates generally to transmission resource or transmission parameters update of various types in wireless communications. Performed by a wireless terminal in a wireless network, the method including receiving a message from a wireless communication node of the wireless network, the message indicating an update to a wireless resource or a transmission parameter associated with the wireless resource, the wireless resource being previously allocated to the wireless terminal for data reception or data transmission; parsing the message based on a type of the update to the wireless resource or the transmission parameter associated with the wireless resource to obtain the update; and transmitting or receiving data, or skipping transmitting or receiving data using the wireless resource based on the update.

17 Claims, 10 Drawing Sheets

(51) Int. Cl.

| | | |
|---|---|---|
| *H04L 25/02* | (2006.01) | |
| *H04W 72/0446* | (2023.01) | |
| *H04W 72/0453* | (2023.01) | |
| *H04W 72/11* | (2023.01) | |
| *H04W 72/1268* | (2023.01) | |
| *H04W 72/231* | (2023.01) | |

(56) References Cited

U.S. PATENT DOCUMENTS

| | | | | |
|---|---|---|---|---|
| 12,021,642 | B2 * | 6/2024 | Zhou | H04L 1/189 |
| 2020/0351674 | A1 | 11/2020 | Zhou et al. | |
| 2021/0136736 | A1 * | 5/2021 | Yang | H04W 72/23 |
| 2022/0124745 | A1 * | 4/2022 | Yang | H04W 72/1268 |
| 2022/0217736 | A1 * | 7/2022 | Taherzadeh Boroujeni | H04W 72/0453 |
| 2023/0117601 | A1 * | 4/2023 | Yoshioka | H04L 5/0055 |
| 2023/0164774 | A1 * | 5/2023 | Fröberg Olsson | H04L 5/0053 370/329 |
| 2024/0015729 | A1 * | 1/2024 | Bhamri | H04W 72/1263 |

OTHER PUBLICATIONS

InterDigital Inc., Inter-UE prioritization/multiplexing, May 25-Jun. 5, 2020, pp. 1-11, 3GPP TSG RAN WG1 #101, R1-2004272, e-Meeting.

Qualcomm, Remaining issues on uplink inter-UE Tx multiplexing and prioritization, Apr. 20-30, 2020, pp. 1-6, 3GPP TSG RAN WG1 #100b eMeeting, R1-2002548.

Vivo, Summary of UL inter UE Tx prioritization for URLLC, Apr. 20-30, 2020, pp. 1-25, 3GPP TSG RAN WG1 #100bis, R1-2001676, e-Meeting.

International Search Report in International Patent Application No. PCT/CN2021/072215 dated Oct. 8, 2021, 3 pages.

Examination Report issued in Canadian Application No. 3,196,635 dated Dec. 3, 2025 (5 pages).

Office Action issued in Korean Application No. 10-2023-7014274 with English translation, dated Dec. 23, 2025 (11 pages).

Moderator (vivo), R1-2007208, Summary #2 of [102-e-NR-L1enh-URLLCInterUE-01] Remaining issues on inter-UE prioritization/multiplexing, 3GPP TSG RAN WG1 #102-E, 3GPP server release date (Aug. 29, 2020) (27 pages).

* cited by examiner third SLIV: frequency first, then time

Time

Frequency

METHOD, DEVICE, AND SYSTEM FOR TRANSMISSION RESOURCE OR TRANSMISSION PARAMETERS UPDATE IN WIRELESS NETWORKS

CROSS-REFERENCE TO RELATED APPLICATION

This application is a continuation application of PCT International Patent Application No. PCT/CN2021/072215, filed with the China National Intellectual Property Administration, PRC on Jan. 15, 2021, which is herein incorporated by reference in its entirety.

TECHNICAL FIELD

This disclosure is directed generally to wireless communications, and particularly to a method, device, and system for transmission resource or transmission parameters update.

BACKGROUND

A wireless network supports various types of services having different requirements for data packets transmission. These requirements include transmission latency, reliability, data priority, etc. When the wireless network schedules data packet transmissions for different applications, for example, applications of different priorities in different User Equipment (UE) or same UE, a collision in time and frequency domain of wireless transmission resources may occur.

SUMMARY

This disclosure is directed to a method, device, and system for transmission resource or transmission parameters update of various types in wireless communications.

In some embodiments, a method performed by a wireless terminal in a wireless network is disclosed. The method may include receiving a message from a wireless communication node of the wireless network, the message indicating an update to a wireless resource or a transmission parameter associated with the wireless resource, the wireless resource being previously allocated to the wireless terminal for data reception or data transmission; parsing the message based on a type of the update to the wireless resource or the transmission parameter associated with the wireless resource to obtain the update; and transmitting or receiving data, or skipping transmitting or receiving data using the wireless resource based on the update.

In some embodiments, a method performed by a wireless communication node in a wireless network is disclosed. The method may include sending a configuration message comprising information associated with a wireless resource to a wireless terminal in the wireless network, the information being associated with data reception or data transmission by the wireless terminal; and composing a message indicating an update to the wireless resource or a transmission parameter associated with the wireless resource based on a type of the update, the update instructing the wireless terminal to transmit or receive data, or skipping transmit or receive data using the wireless resource based on the update.

In some embodiments, there is a wireless communication terminal and/or a wireless communication node comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

The above embodiments and other aspects and alternatives of their implementations are described in greater detail in the drawings, the descriptions, and the claims below.

DETAILED DESCRIPTION

Wireless Communication Network

Figure 1:
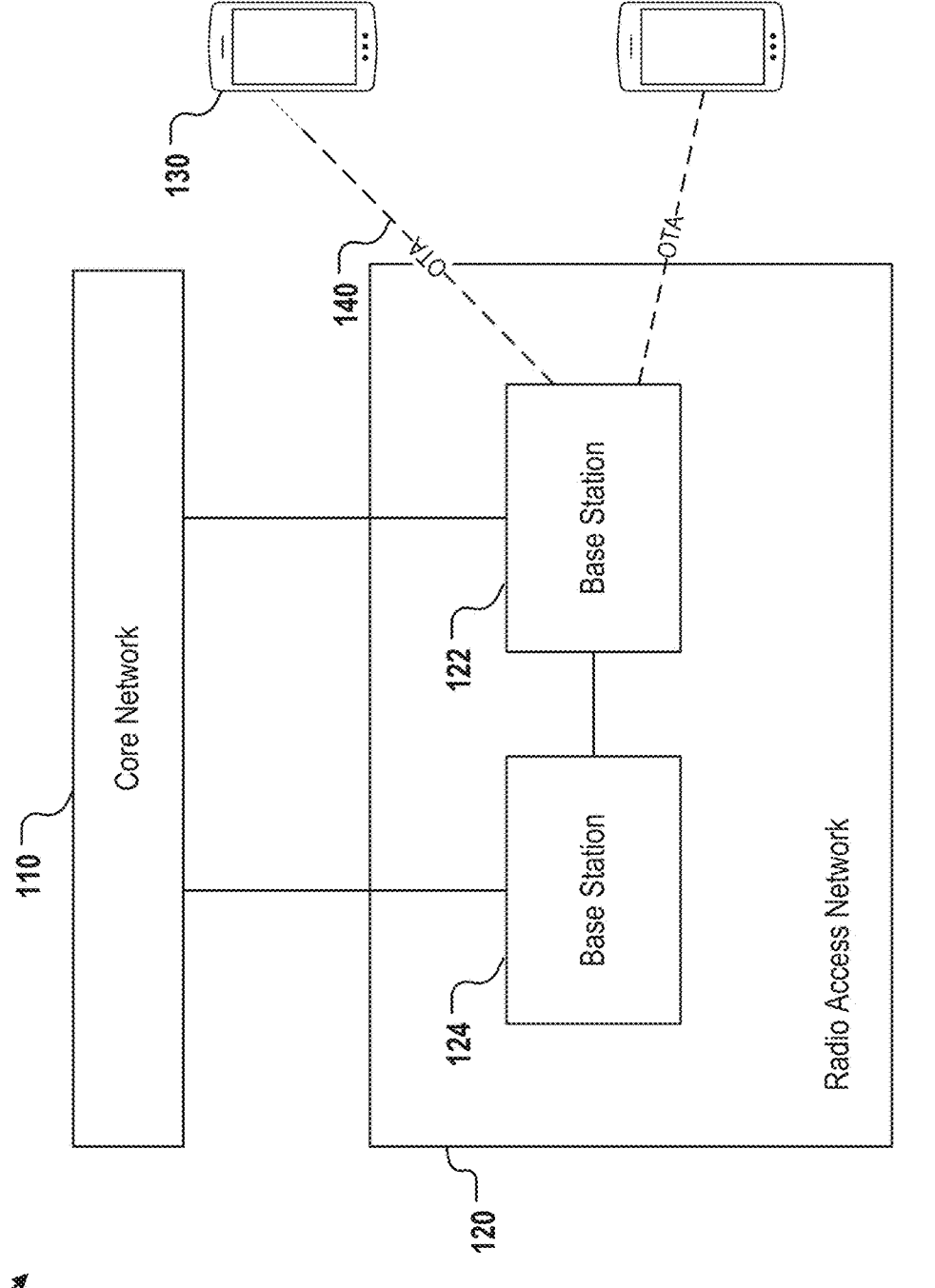
FIG. 1 shows an example wireless communication network.

FIG. 1 shows an example cellular wireless communication network 100 (also referred to as wireless communication system) that includes a core network 110 and a radio access network (RAN) 120. The RAN 120 further includes multiple base stations 122 and 124. The base station 122 and user equipment (UE) 130 communicate with one another via Over the Air (OTA) radio communication resources 140. The wireless communication network 100 may be implemented as, as for example, a 2G, 3G, 4G/LTE, or 5G cellular communication network. Correspondingly, the base stations 122 and 124 may be implemented as a 2G base station, a 3G nodeB, an LTE eNB, or a 5G New Radio (NR) gNB. The UE 130 may be implemented as mobile or fixed communication devices installed with SIM/USIM modules for accessing the wireless communication network 100. The UE 130 may include but is not limited to mobile phones, Internet of Things (IoT) devices, Machine-type communications (MTC) devices, laptop computers, tablets, personal digital assistants, wearable devices, distributed remote sensor devices, roadside assistant equipment, and desktop computers. Alternative to the context of cellular wireless network, the RAN 120 and the principles described below may be implemented as other types of radio access networks, such as Wi-Fi, Bluetooth, ZigBee, and WiMax networks.

In the example wireless communication system 100 of FIG. 1 the UE 130 may connect with and establish a communication session with the base station 122 via the OTA interface 140. The communication session between the UE 130 and the base station 122 may utilize downlink (DL) and/or uplink (UL) transmission resources. The DL transmission resource carries data from the base station 122 to the UE 130, and the UL transmission resource carries data from the UE 130 to the base station 122.

Figure 2:
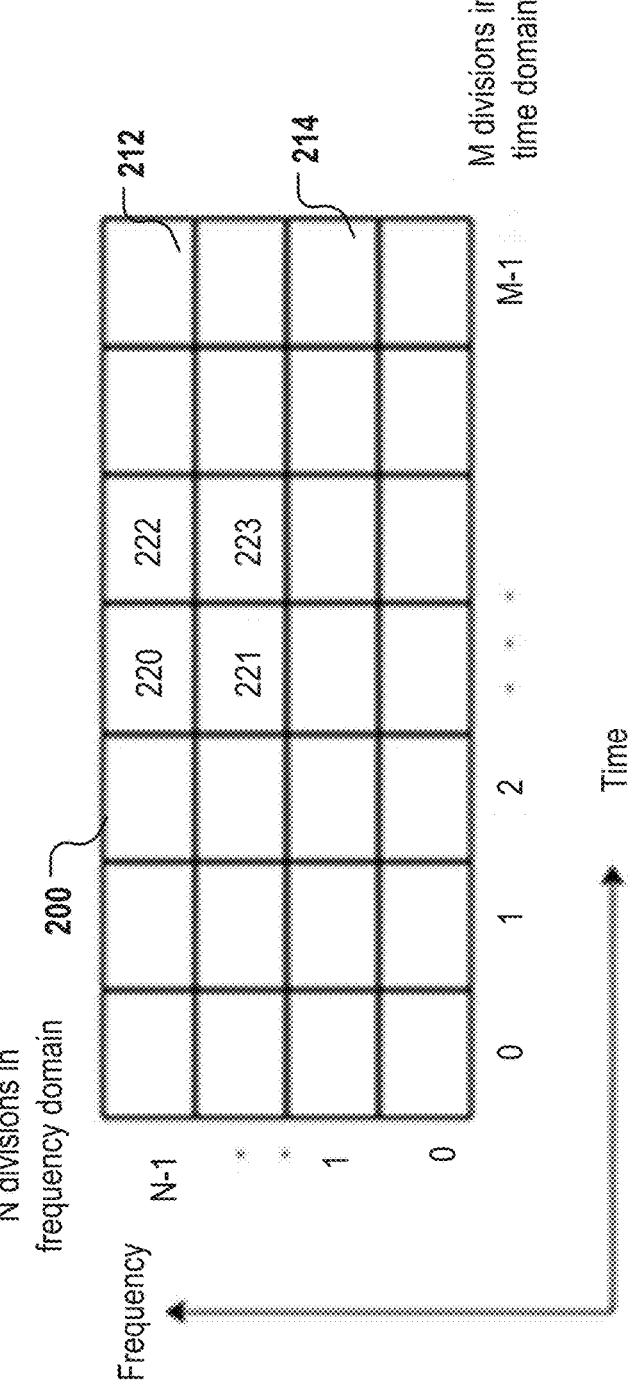
FIG. 2 shows an example wireless transmission resource in time domain and frequency domain.

FIG. 2 illustrate an example wireless transmission resource 200 (also referred to as wireless resource or transmission resource). A transmission resource 200 includes time domain resource and frequency domain resource and may be allocated to carrying data for DL or UL transmissions. The transmission resource 200 may be further divided into sub-blocks to support more flexible transmission resource scheduling and allocation. For example, in the time domain, the transmission resource 200 may be divided into M divisions, and in the frequency domain, the transmission resource 200 may be divided into N divisions. M and N are both positive integers. As such, the transmission resource 200 may be considered as a resource grid including M*N sets (or resource units). In FIGS. 2, 212 and 214 are shown as two example sets. Division of the wireless resource into resource units of FIG. 2 facilitates more efficient resource utilization. A particular combination of resource units allocated for a communication need may be indicated, identified, and located in various manners.

FIG. 2 further illustrates a resource unit as the smallest transmission resource unit that may be scheduled or allocated. The value of M and/or N, or the number of divisions of the available wireless resource into resource units may be adjusted. For example, the bigger the M and/or the bigger the N, the finer the granularity of transmission resource 200. In some implementations, in the wireless source in time domain may be divided in different units at various levels including but not limited to a symbol, a time slot, mini time slot, a subframe, a frame, or their multiples.

In some embodiments, the transmission resource may also include or is associated with its transmission parameters for transmission of data or control information over the various time and frequency domain resource elements, such as a Modulation and Coding Scheme (MCS), HARQ process number, downlink assignment index, transmission power control command, resource indicator, precoding information, number of layers, codeblock group transmission information, transmission power offset, physical resource block bundling size, redundancy version, transmission configuration indication, and the like.

Transmission Resource Scheduling

The wireless network may support multiple UEs. The UEs may share the wireless transmission resource. For example, referring to FIG. 2, the transmission resource unit 212 may be scheduled/allocated for one UE and the transmission resource unit 214 may be scheduled/allocated for another UE. Multiple transmission resources, such as 220 to 223, may be collectively scheduled/allocated to yet another UE. It is to be understood that, for contiguous resource allocation, as long as a time interval (e.g., from t1 to t2), and a frequency range (e.g., from f1 to f2) is specified either explicitly or implicitly, the transmission resource allocation may be uniquely identified in the time domain and the frequency domain.

Various resource scheduling and allocation mechanisms implemented in the wireless network above. When scheduling a transmission resource for DL data transmission, an example scheduling method may be based on dynamic granting (DG). Under this mechanism, a UE may be informed about the transmission resource through signaling or messaging dynamically. For example, a Downlink Control Information (DCI) message may be used for such dynamical allocation. The scheduling method may also be based on persistent or semi-persistent scheduling (SPS).

Under this mechanism, the transmission resource for a UE may be pre-allocated, for example, based on time domain and frequency domain information which are predetermined by base station. In some implementations of the SPS transmission, the UE may begin to use the pre-allocated transmission resource immediately once it is allocated. In some other alternative implementations of the SPS transmission, an activation may be required beforehand. The SPS activation of the pre-allocated transmission resource may be achieved by using signaling at various levels (or layers) such as the Radio Resource Control (RRC) level, Medium Access Control-Control Element (MAC CE), or physical level.

In some other implementations, when scheduling a transmission resource for UL data transmission, the scheduling method may be also based on DG, similar to the DG in the DL data transmission case. The scheduling method for UL data transmission may also be based on configured granting (CG). In CG, for example, the UE may send UL data without transmitting a Scheduling Request (SR) first. In some implementations of the CG transmission, the UE may begin to use the pre-allocated transmission resource immediately once it is allocated. In some other alternative implementations of the CG transmission, an activation may be required beforehand. The CG activation of the pre-allocated transmission resource may be achieved by using signaling at various levels (or layers) such as the RRC level, MAC CE level, or physical level.

The transmission resource scheduling may be based on the priority or 5G QoS Identifier (5QI) of the data or control information to be transmitted. For example, in a case when there are two transmission tasks with varying priorities, the transmission resource may be first scheduled for the transmission task with higher priority. In some implementations, the priority may include, for example, MAC priority and layer 1 priority, and may apply to Downlink Control Information (DCI) of various types. In some other alternative implementations, the priority may be indicated by RRC parameter, MAC CE or DCI.

The underlying principles of the various example implementations disclosed below apply to all the aforementioned and other scheduling algorithms whether they are used separately or used in any combinations.

Transmission Resource Collision

Figure 3:
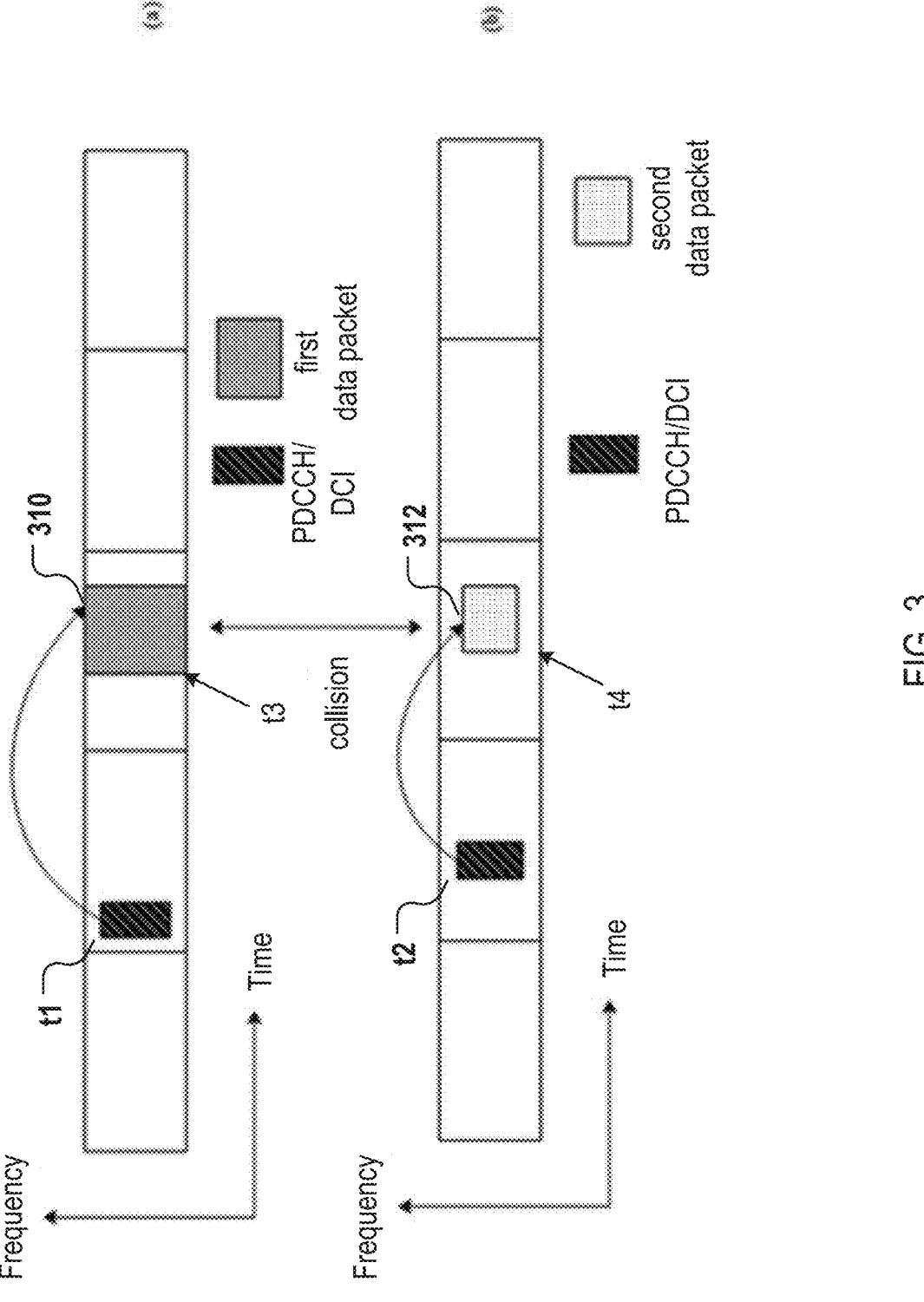
FIG. 3 shows an example collision when scheduling uplink or downlink transmission.

The wireless network may support multiple UEs. Different UEs may run applications having different data packets transmission requirements with respect to, for example, transmission latency, reliability, service priority, 5QI, Quality of Service (QoS), Quality of Experience (QoE), and the like. When scheduling transmission resources for the UEs by the base station, a collision in time and frequency domain of the transmission resources may develop. FIG. 3 shows an example scenario of transmission resource collision. Using DL transmission as an example in FIG. 3, a first data packet for a UE 1 (e.g., with low priority, less stringent latency/reliability requirements) is scheduled at time t1 with a transmission resource 310. Subsequent to t1 but prior to t3, a second data packet for UE 2 (e.g., high priority, more stringent latency/reliability requirement) needs to be scheduled at t2. As the second data packet has higher transmission requirement, if the time interval to the next free transmission resource (i.e., not scheduled to any UE) is too far away from t2 in the future, the base station may be forced to schedule at time t2 with a transmission resource 312 for this higher priority transmission of UE2. Transmission resource 312 may overlap with the transmission resource 310, giving rise to a resource collision. Generally, a resource collision may occur whenever two transmission resources (e.g., scheduled for the same UE or different UEs) overlap in both time domain and frequency domain. Additionally, although the description of resource collision uses DL data packet transmission as an example, the same principle also applies to resource collision in UL data packet transmission.

In FIG. 3, the UE 1 is initially scheduled to use the transmission resource 310 to receive the first data packet in DL. However, at a later time, the transmission resource 310 may be fully or partially overridden (or, pre-empted) by the transmission resource 312 used for the second data packet transmission of UE2. As such, the collision may cause negative performance impact to UE 1. For example, because at least part of the transmission resource 310 carries the second DL data packet of UE2, UE 1 may fail to decode the received data to obtain the expected first data packet, and may thus be trigger to request re-transmission of the first data packet. The additional resource and the delay resulting from such re-transmission may be substantial, thereby degrading the resource utilization efficiency/QoE (Quality of Experience) of UE 1.

To solve the issue above, one solution is to inform UE 1 about the update to the transmission resource before the staring time of transmission resource 310, so that UE 1 obtains the knowledge of the full or partial reallocation of the originally assigned transmission resource 310 and acts correspondingly. The update to the transmission resource 310 may include: transmission resource 310 being totally canceled for UE1; or transmission resource 310 being partially pre-empted for UE 1 (i.e., the portion overlapped with transmission resource 312), as illustrated above in FIG. 3. In the partially pre-empted scenario, the transmission resource not impacted by the pre-emption may still be used by the UE 1.

In some other situations, the update to the allocated resources may involve modification of the transmission parameters (such as code rate, Modulation and Coding Scheme—MCS) of the allocated transmission resource 310 without or in addition to full or partial resource collision. Similar to the resource collision situation, UE1 may also be informed of such modification (update) and acts accordingly in order to avoid trying to receive data relying on previous transmission parameters and having to request retransmission of the first data packet above.

In some other situations, as the channel condition or the interval of data arrival is not constant, the transmission parameters of the DL SPS transmission or UL CG transmission needs to be updated to adapt to the varied channel condition or the pattern of data arrival traffic.

Transmission Resource Update

Various types of transmission resource update are described below. It is to be understood that, the update applies to the transmission resource, and/or transmission parameters associated with the transmission resource. The update may be sent through a message from the base station to the relevant UE. The message may be in the form of a DCI, a MAC CE, an RRC message, or the like. There is no limitation on what message may be used to convey the resource updates or transmission parameter updates in this disclosure.

Type-1 Update—Partial Transmission

In some implementations, the update message includes a pre-emption indication. In some implementations, the update message indicates a pre-empted resource. In some implementations, the pre-empted resource indicated by the update message is not used for the downlink or uplink data transmission. In this case, the transmission resource overlapping with the pre-empted resource is not used for downlink or uplink data transmission. In some cases, the overlapping in frequency domain is defined in a physical resource block (PRB) level or resource element (RE) level. In some cases, the overlapping in time domain is defined in a symbol level, slot level or system frame level. For example, if the overlapping in frequency domain is defined in a PRB level, the PRB of the transmission resource overlapping with the pre-empted resource is not used for downlink or uplink data transmission. For example, if the overlapping in time domain is defined in a symbol level, the symbol of the transmission resource overlapping with the pre-empted resource is not used for downlink or uplink data transmission.

In some cases, the pre-empted resource is also referred as but not limited to "unavailable resource", or "rate-matching pattern".

Figure 4:
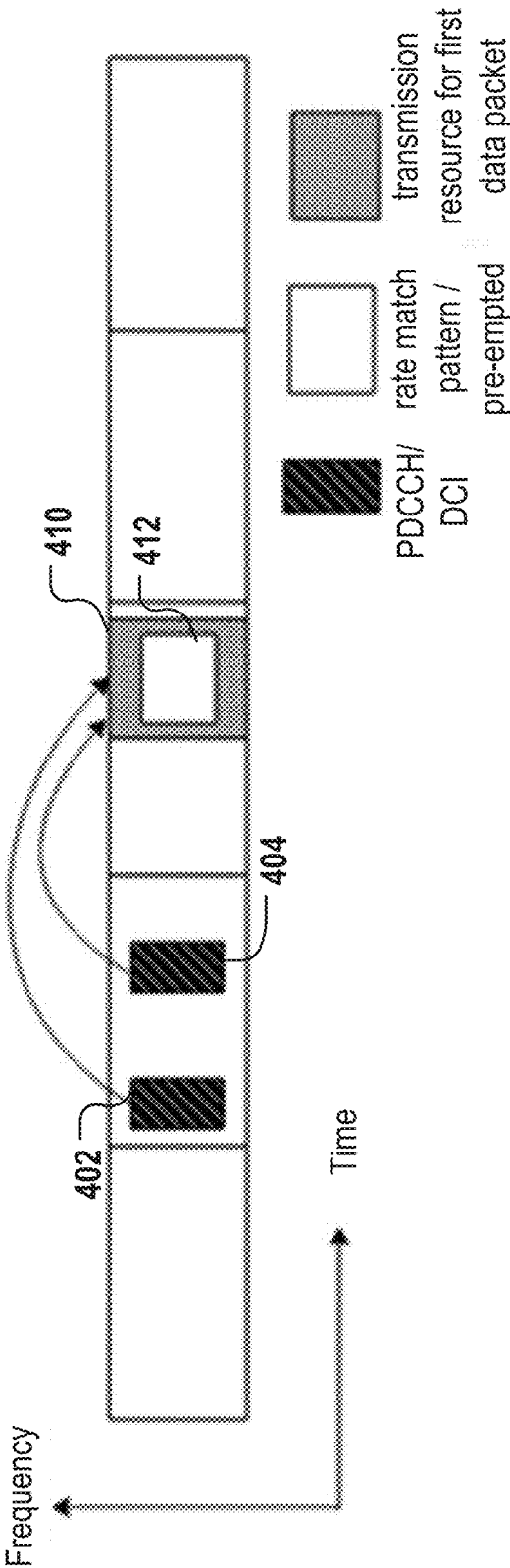
FIG. 4 shows an example wireless transmission resource being partially pre-empted or rate matched.

In some implementations, partial transmission resource assigned to the UE is canceled or pre-empted. Referring to FIG. 4, a message 402 from the base station may be used to indicate to the UE that a transmission resource 410 is assigned to the first data packet for the UE. After a collision is detected on the transmission resource 410, a message 404 is sent to indicate to the UE that a portion of the transmission resource 410 (excluding the hollow 412) is available for the first data packet, the resource portion 412 is preempted or retracted, and that the UE needs to avoid using or skipping the transmission resource as indicated by the hollow 412. As such, the transmission resource as indicated by the hollow 412 is cancelled for the UE.

In some implementations, the Transport Block Size (TBS) is determined by removing the pre-empted resource from the transmission resource. In this case, to use the updated transmission resource (410 excluding 412), the TBS of the transmission is determined by deducting the pre-empted resource 412.

In some implementations, the data transmission utilizing the updated transmission resource 410 may be rate matched and the hollow 412 may be referenced as the rate match pattern. In other words, the first data packet originally scheduled to be transmitted over resource 410 may then be transmitted over the reduced resource (410 excluding 412) with increased data rate.

In some implementations, the message 404 with the update message is sent to the UE before or after the resource 401. If the message 404 is sent to UE before the resource 401, UE can receive or transmit data with the updated transmission resource in some implementation. If the message 404 is sent to UE after the resource 401, UE can combine the initial and re-transmission data in a right way in some other implementations, which improves the decoding performance of re-transmission.

In some implementations, the resource portion 412 corresponds to the collision area and the transmission resource as indicated by the resource portion 412 may have been assigned to another data transmission with higher priority.

In some implementations, the data transmission may be DL or UL transmission.

Type-2 Update—Cancellation of the Transmission Resource

In some implementations, the update message includes a cancellation indication. In some implementations, the update message indicates a pre-empted resource. In this case, the transmission resource or a data transmission overlapping with the pre-empted resource is canceled. In some cases, the overlapping in frequency domain is defined in a PRB level or RE level. In some cases, the overlapping in time domain is defined in a symbol level, slot level or system frame level.

In some implementations, the update message includes a cancellation indication. In some implementations, the update message includes an identifier or a triggering state. In this case, the transmission resource or a data transmission associated with the identifier or triggering state is canceled.

Figure 5:
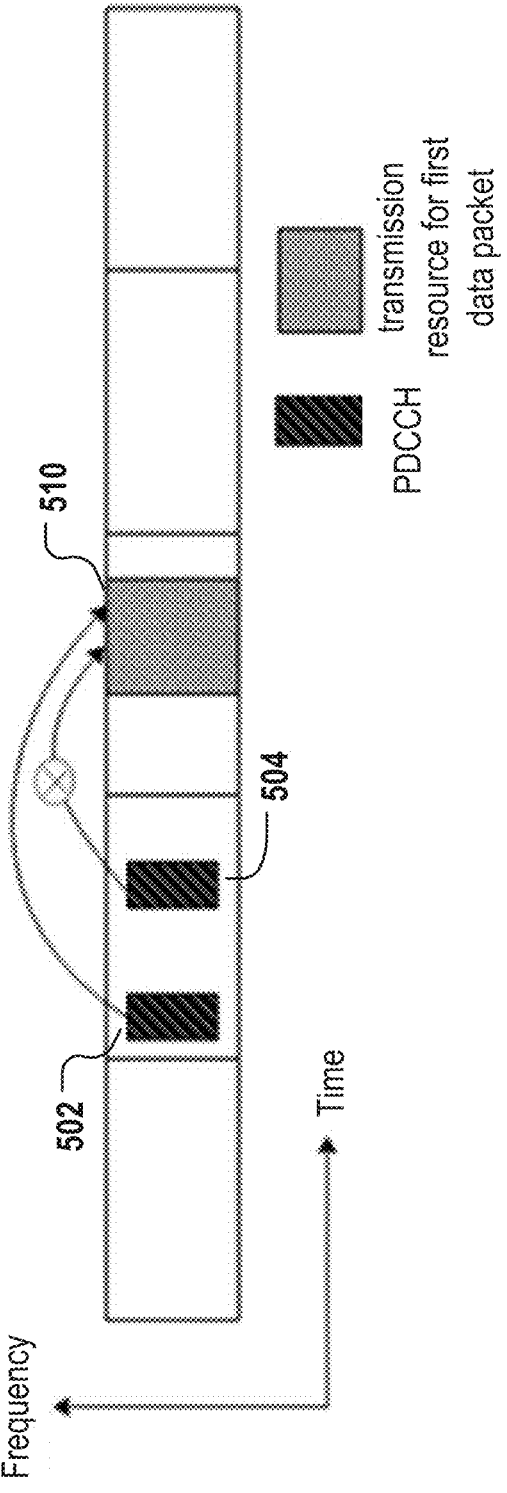
FIG. 5 shows an example wireless transmission resource being canceled.

In this implementations, the whole transmission assigned to the UE is canceled. Referring to FIG. 5, a message 502 from the base station may indicate to the UE that a transmission resource 510 is assigned to the first data packet for the UE. After a collision is detected on the transmission resource 510, a message 504 is sent to indicate the UE that the whole transmission resource 510 is cancelled and the UE needs to avoid using the transmission resource 510. In some cases, the cancellation indication is implemented by indicating a pre-emption resource. The transmission resource 510 which overlaps with the pre-emption resource is canceled. In some other cases, cancellation indication is implemented by indicating an identifier or a triggering state. The transmission resource 510 which is associated with the identifier or the triggering state is canceled.

In some implementations, the data transmission may be DL or UL transmission.

In some implementations, the data transmission may be DL transmission only.

Type-3 Update—Transmission Power Adjustment

In some implementations, the update message includes a transmission power adjustment indication.

In some implementations, the update message includes a pre-empted resource. In this case, the transmission power of the data transmission with transmission resource overlapping with the pre-empted resource is adjusted. In some cases, the overlapping in frequency domain is defined in a PRB level or RE level. In some cases, the overlapping in time domain is defined in a symbol level, slot level or system frame level.

In some implementations, the update message includes a transmission resource identifier. In this case, the transmission power of the data transmission associated with the transmission resource identifier is adjusted.

In some embodiments, the update message may carry a power control information. In some example, the power control information is used for adjusting the transmission power of the data transmission associated with the transmission resource or pre-empted resource.

Type-4 Update—Update One or More Transmission Parameters, or Re-Schedule the Transmission In some implementations, the update message includes a transmission parameter update.

In some implementations, the update message includes a configuration index or a configuration group index. In some implementations, the configuration index is associated with SPS configuration or a Configured grant configuration. In some implementations, the configuration group index is associated with a group of SPS configurations or a group of Configured grant configurations.

In this implementations, the DL or UL transmission may be re-scheduled with an updated transmission resource, or one or more transmission parameters of the transmission resource are updated, for example, to reduce the potential collision of different traffic packets or to adapt to the varied channel condition or data arrival traffic.

In some implementations, the one or more transmission parameters may include at least one of:

Time domain resource allocation (TDRA) information;
Frequency domain resource allocation information;
Modulation and coding scheme;
Power control information;

Repetition factor;
Number of MIMO (Multiple Input Multiple Output) layers or antenna ports;
Demodulation reference signal (DMRS) configuration;
Frequency hopping information;
Precoding information; or
Location information of the type of update.

In some implementations, the transmission parameter is used by SPS transmission or CG transmission.

In some implementations, the time domain resource allocation information includes at least one of a periodicity, an offset, duration, or Start and length information of the data transmission.

In some implementations, the periodicity is the transmission periodicity if the SPS transmission or CG transmission. In some embodiments, the offset is defined in relative to a system frame.

In some implementations, the frequency domain resource allocation information includes at least one of a starting position, or a number of resource blocks, a granularity of a resource block group.

In some implementations, the frequency hopping information includes at least one of a frequency hopping type, or a frequency hopping offset. In some embodiments, the frequency hopping type includes at least one of intra-slot hopping or inter-slot hopping.

In some implementations, the power control information includes at least one of a power transmission offset, a power control command.

In some implementations, the repetition factor determines the number of repetition times of the data transmission.

In some implementations, the SPS transmission or CG transmission is configured to UE to reduce the transmission latency. However, some parameters of the data packets, such as the interval of data arrival, or a size of the data packet, may vary with time. An update of the transmission can be indicated to UE to adjust the configuration to fit in the data traffic.

Figure 6:
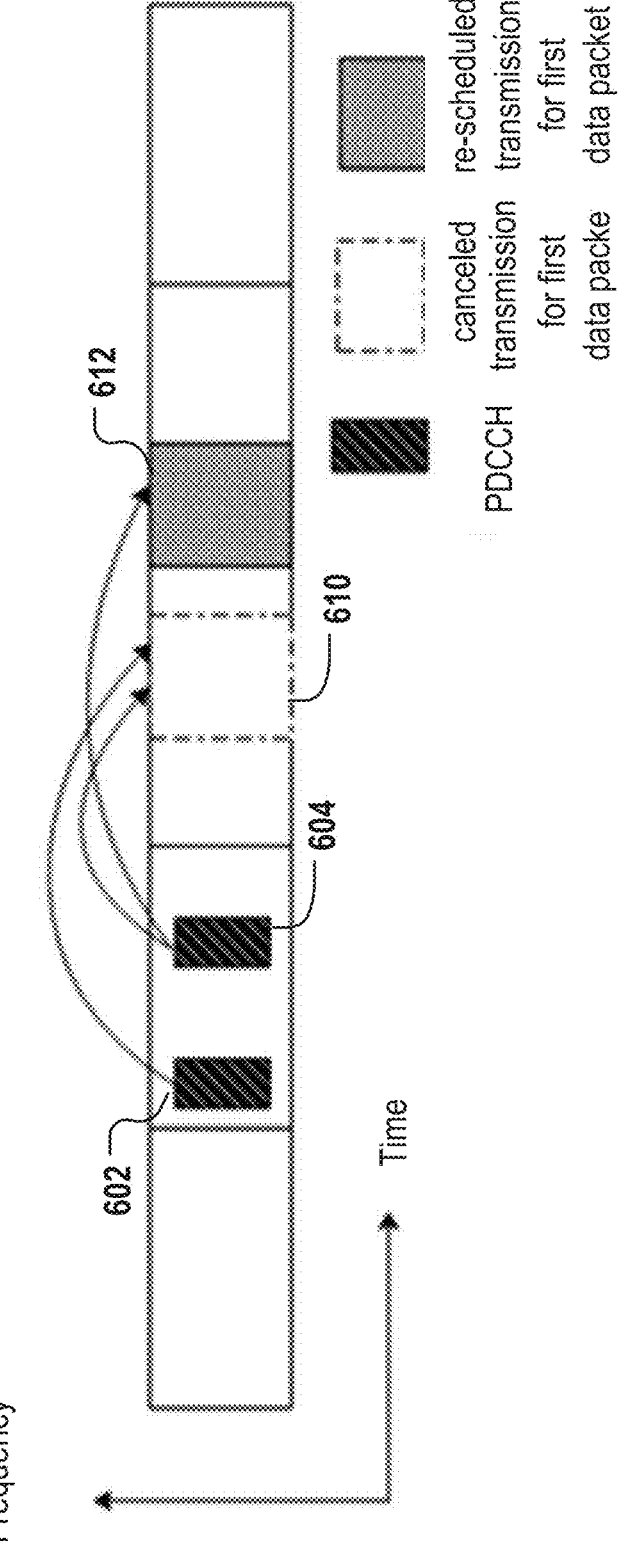
FIG. 6 shows an example wireless transmission resource being re-scheduled.

Referring to FIG. 6, a message 602 from the base station may indicate to the UE that a transmission resource 610 is assigned to the first data packet. After a collision is detected on the initial transmission resource 610, a message 604 is sent to indicate to the UE that the transmission resource 610 is cancelled, and a re-scheduled transmission resource 612 is schedule for the UE. The message 604 may also be used to indicate to the UE about the update to the aforementioned transmission parameters, which is not shown in FIG. 5.

In some implementations, even without collision, the message 604 may be used indicate reallocation of resources (e.g., to 612) and/or modification of transmission parameters above.

Identification of Transmission Resource Update

As described above, the base station may send a message (404 of FIG. 4, 504 of FIG. 5, and 604 of FIG. 6 above) to the UE to indicate the update to the transmission resource or transmission parameters associated with the transmission resource. To decode the message, the UE may first identify what type of the update is carried in the update message first.

In some implementations, the type of the update (for example, at least one of the Type-1, Type-2, Type-3, or Type 4) may be indicated explicitly by an information element or an information field in the message.

In some implementations, the type of the update may be determined according to at least one of the following:

Higher layer parameter. For example, a parameter from RRC (Radio Resource Control) or MAC CE (Media Access Control-Control Element) layer;

UE parameter such as UE capability or UE assistance information; or

DCI format, if the message is a DCI message. For example, the Type-1 update may be conveyed by the DCI format 2_1. For example, the Type-2 update and/or Type-3 update may be conveyed by the DCI format 2_4. For example, the Type-4 update may be conveyed by at least one of the DCI format 00, DCI format 0_1, DCI format 02, DCI format 10, DCI format 1_1, DCI format 1_2. For example, the update of the DL transmission may be conveyed by DCI format 2_1. For example, the update of the UL transmission may be conveyed by DCI format 2_4.

Applicability of the Update

After a UE received an update to the transmission resource or transmission parameters associated with the transmission resource, the UE may optionally decide whether to apply the update. The DL/UL data transmission carries various transmission characteristics to meet its respective service requirement. These transmission characteristics may be considered by the UE to determine whether to apply an update to the transmission.

Specifically, the data transmission carries data for multiple types of information, such as information transmitted via control channel or data channel, or reference signal. The transmission characteristics may be categorized into multiple categories which is described below.

The DL transmission or DL data transmission includes at least one of the following:

PDSCH (Physical Downlink Shared Channel);

Demodulation Reference Signal (DM-RS);

Channel State Information Reference Signal (CSI-RS);

PDCCH (Physical Downlink Control Channel);

Demodulation Reference Signal (DM-RS) associated with PDSCH or PDCCH; or

Sounding Reference Signal (SRS). For example, the SRS may be used for positioning or interference measurement.

The UL transmission or UL data transmission includes at least one of the following:

PUSCH (Physical Uplink Shared Channel);

SRS;

PUCCH (Physical Uplink Control Channel); or

DM-RS associated with PUSCH or PUCCH.

In some implementations, the transmission characteristics may include at least one of:

Transmission type;

Transmission format;

RNTI associated with the transmission;

Information conveyed by the UL or DL transmission;

Code rate;

Modulation order;

Transmission block size;

Transmission priority;

Resource allocation;

QoE, or 5QI, or QoS;

Latency or reliability requirement (e.g., 5QI, or target Block Error Ratio (BLER)); or Traffic model (e.g., jitter).

In some implementations, the update is applicable to DL transmission or UL transmission when the corresponding transmission characteristics meet its respective requirement.

In some implementations, the update is applicable to DL transmission or UL transmission when the transmission type of the DL transmission or UL transmission meet its respective requirement.

In some implementations, the update is applicable to DL transmission or UL transmission when the transmission format of the DL transmission or UL transmission meet its respective requirement. In some embodiments, the update is applicable to UL or DL transmission when the transmission format of the DL transmission meet its requirement. For example, when UL or DL transmission is scheduled by a specific DCI format. In some embodiments, the update is applicable to UL transmission when the transmission format of the UL transmission meet it requirement. For example, when the UL transmission is PUCCH and the PUCCH is of a specific format.

In some implementations, the update is not applicable to DL transmission or UL transmission when the associated RNTI of the DL transmission or UL transmission meet its respective requirement. For example, when the associated RNTI includes at least one of the P-RNTI, SI-RNTI, RA-RNTI, Msg-B-RNTI, TC-RNTI, the update is not applicable to DL transmission or UL transmission. In this example, the data scheduled by DCI with CRC bits scrambled by P-RNTI, SI-RNTI, RA-RNTI, Msg-B-RNTI, TC-RNTI is a broadcast information or for UE without complicated RRC configuration, these data transmission is prioritized.

In some implementations, the update is not applicable to DL transmission or UL transmission when the information conveyed by the DL transmission or UL transmission meet its respective requirement. For example, when the information conveyed by the DL transmission or UL transmission is at least one of scheduling request, HARQ-ACK information, the update is not applicable to DL transmission or UL transmission. In this example, the scheduling request, HARQ-ACK information is important for data scheduling, these kinds of transmissions are prioritized.

In some embodiments, the transmission type includes at least periodic transmission, semi-persistent transmission, or a-periodic transmission.

In some embodiments, the transmission type includes dynamic scheduled transmission, downlink semi-persistent scheduled transmission, uplink configured grant transmission, or any transmission type that is impacted or based on the jittering effect of the corresponding services, wherein the jittering effect includes core network (CN) jittering and/or slice jittering due to the encoding processing of the file trace characteristics.

In some embodiments, the transmission type includes an initial transmission or a re-transmission.

In some embodiments, the transmission type is indicated by the priority of the corresponding DL/UL transmission.

In some embodiments, the transmission format includes the format of the DCI where the DCI is transmitted by the PDCCH.

In some embodiments, the transmission formats includes the format of the PUCCH.

In some embodiments, the transmission formats includes the format of the DCI scheduling the PDSCH or PUSCH.

In some embodiments, the transmission formats includes the format of the DCI where the DCI is collocated/embedded/rate matched in the PDSCH/PUSCH region.

In some embodiments, the associated RNTI includes the RNTI that scrambles the CRC bits of the DCI.

In some embodiments, the associated RNTI includes the RNTI that scrambles the CRC bits of the DCI scheduling the PDSCH or PUSCH.

In some embodiments, the transmission priority includes at least one of a priority configured by higher layer parameter, a priority of configured grant transmission, a priority of physical layer, a priority of SPS transmission, a priority associated with Hybrid automatic repeat request acknowl-edgement (HARQ-ACK) codebook, a priority associated with or indicated by the update message. In some embodi-ments, the transmission priority is associated with at least one of 5QI, QoS, QoE, or traffic type of the data transmis-sion.

In some embodiments, the transmission priority is a layer 1 or physical layer priority.

In some embodiments, when the transmission priority of data transmission meet its respective requirement, the update is not applicable to the data transmission. In some embodiments, when the transmission priority associated with the update message meet its respective requirement, the update is applicable to the data transmission. In some embodiments, when the transmission priority associated with the update message is higher than the transmission priority of data transmission, the update is applicable to the data transmission.

In some embodiments, the resource allocation includes at least one of:

The time interval between the DL or UL transmission resource and the DCI indicating the pre-empted resource. For example, when the time interval between the DL or UL transmission resource and the DCI indicating the pre-empted resource fulfill a first thresh-old value, the update is applicable to the DL or UL transmission.

The time interval between the DCI indicating the pre-empted resource and the DCI indicating the DL or UL transmission resource. For example, when the time interval between the DCI indicating the pre-empted resource and the DCI indicating the DL or UL trans-mission resource fulfill a second threshold value, the update is applicable to the DL or UL transmission.

The time interval between the DL or UL transmission and the pre-empted resource. For example, as shown in FIG. 3, the time interval between t3 and t4. For example, when the time interval between the DL or UL transmission resource and the pre-empted resource fulfill a third threshold value, the update is applicable to the DL or UL transmission.

In some implementations, the first threshold value, the second threshold value and the third threshold value may be associated with at least one of the PDCCH processing time, PDSCH decoding time, PUSCH preparation time, a UE capability, a higher layer parameter, or a predetermined value. In some implementations, the first threshold value, the second threshold value and the third threshold value may be associated with UE capability. In this example, the time required by processing PDCCH, PUSCH, and PDSCH is considered. If the time interval is less than the required processing time, the update is not applicable to the DL or UL transmission.

Indicating Pre-Empted or Retracted Transmission Resource: Overview

When a transmission resource collision occurs, the base station may proceed to locate the position of the pre-empted (i.e., overlapped) transmission resource from both the time domain and the frequency domain perspective following a determination of the update type as described above. The location information, for example, may be forwarded from the base station to the UE.

The location information may be directly forwarded to the UE in a message. A coordinate system may be introduced with time information as the x-axis and frequency domain information as the y-axis. The location information may be based on the coordinates of the pre-empted resource. In some embodiments, the message may be a DCI message, an RRC message, a MAC CE, or a physical layer message. In some embodiments, the message may be the message indi-cating the update to the transmission resource or transmis-sion parameters.

Alternatively, the overlapped transmission resource, denoted here as the pre-empted transmission resource or retracted transmission resource, may be located with refer-ence to a reference transmission resource, and the pre-empted resource may be located as a subset of the reference transmission resource. Referring to FIG. 2, transmission resource 200, which contains M*N cells, may be considered as an exemplary reference transmission resource. The trans-mission resource formed by resource units 220, 221, 222, and 223 are shown as an exemplary pre-empted resource.

The location information (i.e., time domain and frequency domain information) of the reference transmission resource may be determined by the base station and forwarded to the UE. Alternatively, the reference transmission resource may be pre-determined. Alternatively, the reference transmission resource is configured by base station. Once the location information about the reference transmission resource is known to the UE, the location information about the pre-empted resource may be determined with reference to the reference transmission resource.

Details on the determination of the reference transmission resource and the location information of the pre-empted resource relative to the reference transmission resource are described below.

Reference Transmission Resource: Time Domain

In some implementations, the reference transmission resource in time domain may be determined by at least one of the following:

A higher layer parameter, such as RRC parameter, MAC CE, or the like. For example, the higher layer parameter may include at least one of a periodicity of the refer-ence transmission resource, or an offset with respect to, for example, frame, subframe, slot, mini slot, or sym-bol. In some embodiments, the duration of the refer-ence transmission resource in time domain maybe a multiple of a pre-determined value. For example, the pre-determined value may be 7 or 2. In this example, the pre-determined value (i.e., 7 or 2) divides the number of symbols within one slot value (i.e., 14);

Periodicity of a search space set;

The search space set may be configured with the format of the DCI which carries the transmission resource update information. For example, the DCI 404 in FIG. 4.

The search space set may be configured with the format of the DCI which schedules the DL or UL transmis-sion. For example, the DCI 402 in FIG. 4.

The search space set may be determined by the mini-mum or maximum periodicity of the search space sets from a search space set group.

UE processing time of PDCCH, or DL transmission, or UL transmission;

A predefined parameter;

Sub-carrier spacing;

UE parameter such as UE capability;

TDD configuration pattern; or

A monitoring occasion pattern of a search space set may be configured with the format of the DCI which carries the transmission resource update information.

In some implementations, the monitoring occasion of a PDCCH candidate may be determined by the corresponding search space set with a plurality of parameters such as periodicity, offset, duration, or a bitmap indicating the monitoring occasion within a slot.

Optionally, the reference transmission resource in time domain may be associated with a reference sub-carrier spacing. The reference sub-carrier spacing may be one of the following:

A sub-carrier spacing of the active bandwidth part (BWP) of a predetermined serving cell, where the predetermined serving cell may include at least one of the following:

A serving cell where UE receives the indication on transmission resource update;

A serving cell that is scheduled by the DCI to perform DL or UL transmission;

A serving cell that is configured by higher layer parameter;

A serving cell that has the smallest or largest sub-carrier spacing among one or more activated or associated serving cell of the UE; or A primary cell or PScell (Primary Secondary Cell).

Optionally, the reference transmission resource in time domain may include at least one of the following:

A duration of the reference transmission resource in time domain; or

A start or an end time of the reference transmission resource in time domain.

Optionally, the reference transmission resource in time domain comprises a duration prior to one of the following:

An occasion where the DCI indicating the transmission resource update is received; or The transmission resource.

An occasion where the DCI schedules the transmission resource is received

Optionally, the reference transmission resource in time domain comprises a duration after one of the following:

An occasion where the DCI indicating the transmission resource update is received; or An occasion where the DCI schedules the transmission resource is received.

Optionally, the duration of the reference transmission resource in time domain is determined by at least one of a higher layer parameter, periodicity of a search space, a predefined parameter, TDD configuration pattern.

Optionally, the start or end of the reference transmission resource in time domain is determined by at least one of a higher layer parameter, UE processing time of PDSCH, PDCCH or PUSCH, UE capability, or a predefined parameter.

Optionally, the duration of reference transmission resource in time domain may be a multiple of one of: slot, mini slot, symbol, subframe, or frame of the one or more activated or associated serving cell.

Optionally, the start or end of reference transmission resource in time domain aligns with the boundary of one of: slot, mini slot, symbol, subframe, or frame of the one or more activated or associated serving cells.

Reference Transmission Resource: Frequency Domain

In some implementations, the reference transmission resource in frequency domain may be determined by at least one of the following:

Higher layer parameter, such as RRC parameter, MAC CE, or the like. In some implementations, the duration of the reference transmission resource in frequency domain is a multiple of a predetermined value;

An active DL or UL BandWidth Part (BWP);

A predefined parameter;

a sub-carrier spacing;

a point A; or

UE parameter such as UE capability.

Optionally, the reference transmission resource in frequency domain may be determined by a reference sub-carrier spacing. The reference sub-carrier spacing may include the sub-carrier spacing of the active BWP of a predetermined serving cell. Where the predetermined serving cell includes one of the following:

A serving cell where UE receives the indication on transmission resource update;

A serving cell that is scheduled by the DCI to perform DL or UL transmission;

A serving cell that is configured by higher layer parameter;

A serving cell that has the smallest or largest sub-carrier spacing among one or more activated or associated serving cell of the UE; or A primary cell or PScell.

Optionally, the reference transmission resource in frequency domain may include at least one of the following:

A range of the reference transmission resource in frequency domain; or

A start or end of the reference transmission resource in frequency domain

Optionally, the range of reference transmission resource in frequency domain may be determined by at least one of a higher layer parameter, a bandwidth of an active DL or UL BWP, a predefined parameter, UE capability.

Optionally, the start or end of reference transmission resource in frequency domain may be determined by at least one of a higher layer parameter, a predefined parameter, or point A. For example, the start or end of reference transmission resource in frequency domain is defined in relative to Point A.

In some embodiments, the point A is a common reference point for the resource grids in the frequency domain, is the center of the subcarrier 0 of a common resource block 0.

Optionally, the range of reference transmission resource in frequency domain may include a multiple of Physical Resource Block (PRB) or Resource Element (RE) of the one or more activated or associated serving cells of the UE.

Optionally, the start or end frequency of reference transmission resource in frequency domain align with the boundary of one of: PRB, RE, or Common resource block (CRB) of the one or more activated or associated serving cells of the UE.

Indicating Pre-Empted Resource

As described above, in some embodiments, the pre-empted transmission resource may be a subset of the reference transmission resource. The location information of the pre-empted transmission resource may be determined with reference to the reference transmission resource. Also as described above, as shown in FIG. 2, the reference transmission resource may include M*N resource units. Various example embodiments for identifying the location information of the pre-empted resource are disclosed below. In some implementations, the each resource unit in time domain may comprise one or more symbols, slots, or system frames. In some implementations, the each resource unit in frequency domain may comprise one or more RE, or RB.

Type 1 Indication

In some embodiments, the location information in time and/or frequency domain of the pre-empted resource may be determined by a bit map. The update message may carry the bit map.

For example, a first plurality of bits (M bits) of the bit map indicate the pre-empted resource in time domain. The M bits may be one-to-one mapped to the M divisions of the reference resource in time domain. For example, the pre-empted resource in time domain includes the divisions indicated by the M bits when the value of the corresponding bit in the bit-map is 1. Alternatively, the pre-empted resource in time domain includes the divisions indicated by the M bits when the value of the corresponding bit in the bit map is 0.

In some embodiments, a second plurality bits (N bits) of the bit map indicate the pre-empted resource in frequency domain. The N bits is one-to-one mapped to the N divisions of the reference resources in frequency domain. For example, the pre-empted resource in frequency domain includes the divisions indicated by the N bits when the value of the corresponding bit in the bit map is 1. Alternatively, the pre-empted resource in frequency domain includes the divisions indicated by the N bits when the value of the corresponding bit in the bit map is 0.

In some embodiments, the length of the bit map equals to M*N or M+N.

In some embodiments, a first bit map may be used to indicate the location of the pre-empted resource information in time domain. The first bitmap may be one-to-one mapped to the M divisions of the reference resource in time domain. For example, the pre-empted resource in time domain includes the divisions indicated by the first bitmap when the value of the corresponding bit in the first bit-map is set to a predetermined value.

In some embodiments, a second bit map may be used to indicate the location of the pre-empted resource information in frequency domain. The second bitmap may be one-to-one mapped to the N divisions of the reference resource in frequency domain. For example, the pre-empted resource in frequency domain includes the divisions indicated by the second bitmap when the value of the corresponding bit in the second bitmap is set to a predetermined value.

Example 1

Figure 7:
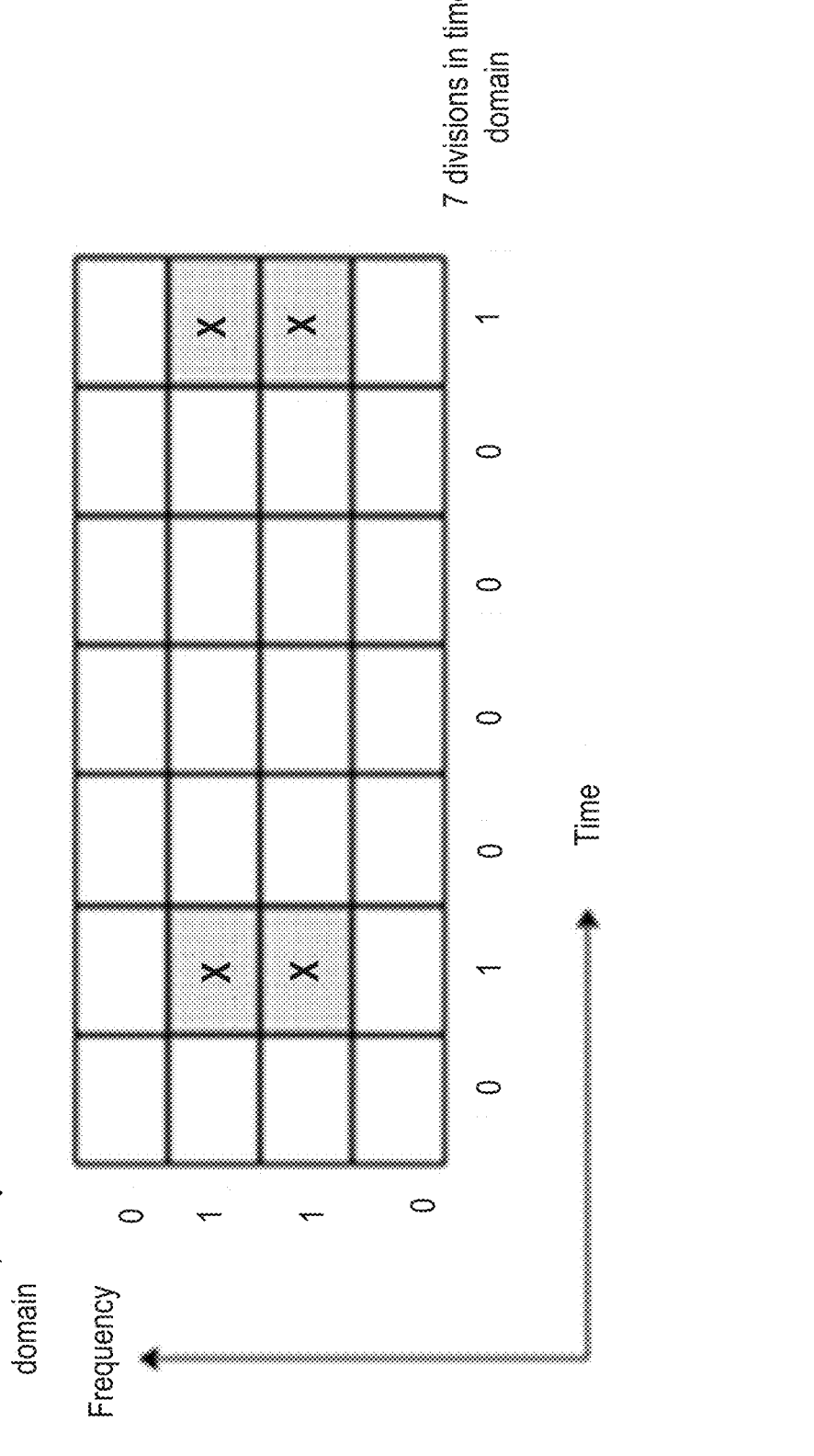
FIG. 7 shows an example for identifying resource units in a wireless transmission resource.

Refer to FIG. 7, for an example, the pre-empted resource within the reference resource may be indicated by a bit map. The length of the bit map equals to 11, wherein M=7, N=4. For the example of FIG. 7, the M bits in time domain are (0100001), the N bits in frequency domain are (0110). The pre-empted source is correspondingly highlighted and marked with (X).

Example 2

Still referring to FIG. 7 for an example, the pre-empted resource within the reference resource indicated by another bit map. The length of the bit map equals to 28, wherein M=7, N=4. In this example, each of the 28 bits in the bit map corresponds to a resource unit. A bit with value set to 1 indicates the resource unit of the preempted resource.
Type 2 Indication In some embodiments, the location information of the pre-empted resource in time domain may be determined by a start and a duration of the corresponding resource in time domain, a start and an end of the corresponding resource in time domain, or by an end and a duration of the corresponding resource in time domain. In some embodiments, the location information of the pre-empted resource in frequency domain may be determined by a start and a duration of the corresponding resource in frequency domain, a start and an end of the corresponding resource in frequency domain, or by an end and a duration of the corresponding resource in frequency domain.

In some embodiments, the combination of the (start+duration), (start+end) or the (end+duration) may be indicated by an indicator, such as SLIV (Start and Length Indicator Value), or RIV (Resource Indication Value), or any other indicator which identifies time or frequency resources.

Figure 8:
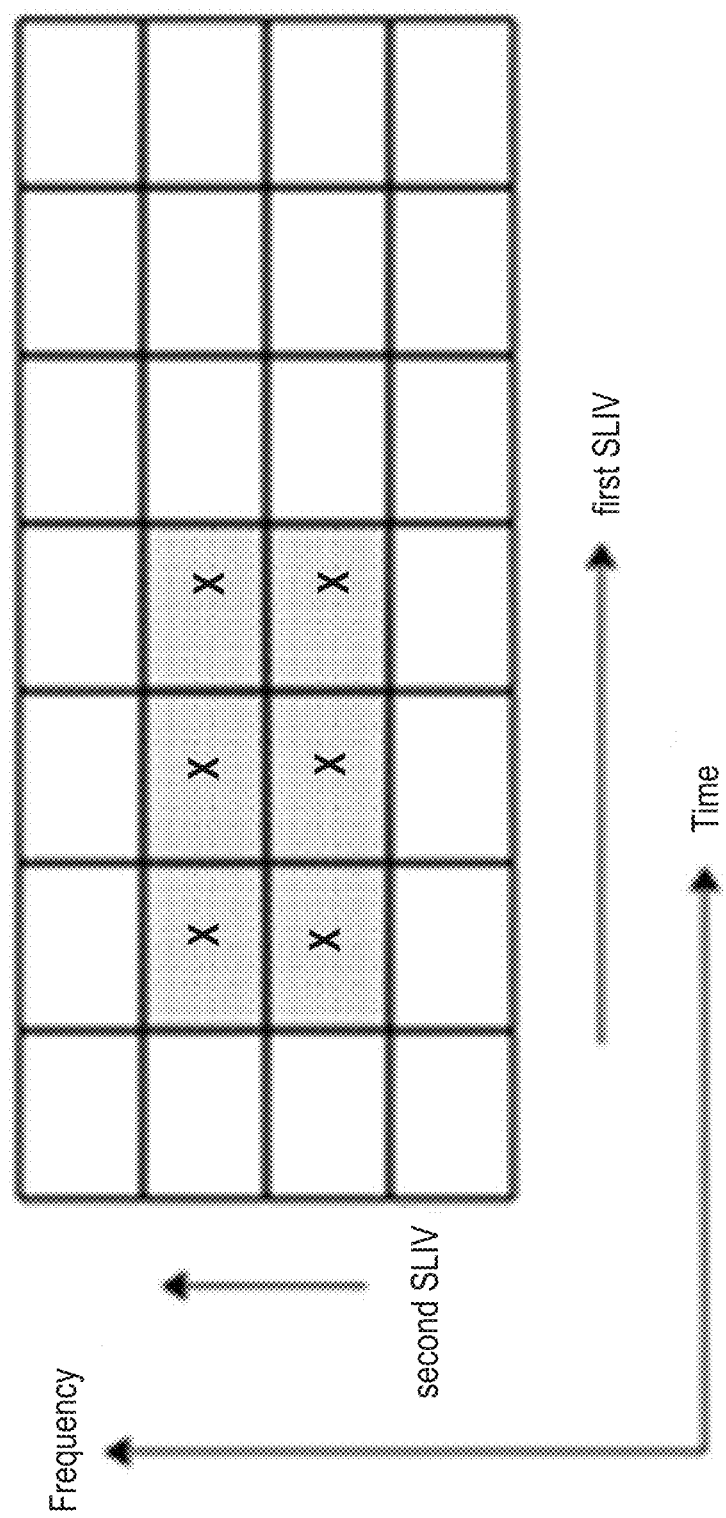
FIG. 8 shows another example for identifying resource units in a wireless transmission resource.

For example, the pre-empted resource in time domain may be indicated by a first SLIV indicator. For example, the preempted resource in frequency domain may be indicated by a second SLIV indicator. FIG. 8 shows an example of using SLIV for identifying the pre-empted resource, which is highlighted and marked with (X).

In some embodiments, each division of the reference resource may be numbered in a predetermined pattern and the pre-empted resource may be identified by traversing the predetermined pattern. For example, the predetermined pattern may traverse the frequency first, then time, or vice versa.

In some embodiments, the pre-empted resource within the reference resource may be indicated by a third indicator. For example, the third indicator may be a SLIV or RIV indicator. The time domain and frequency domain information of the pre-empted resource based on the third indicator indicating a pattern generated via one of the following ordering principle: time domain first then frequency domain; or frequency domain first then time domain.

Figure 9:
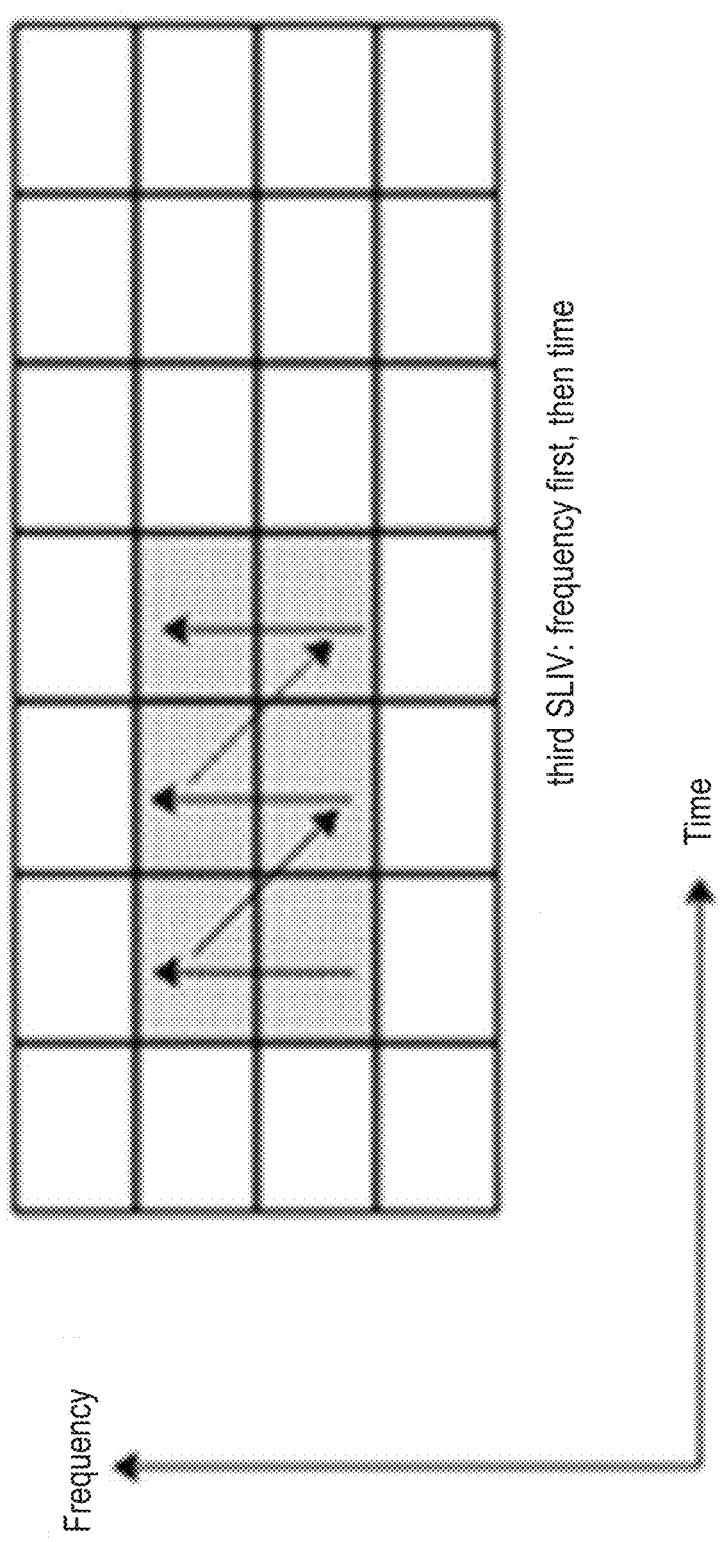
FIG. 9 shows another example for identifying resource units in a wireless transmission resource.
Figure 10:
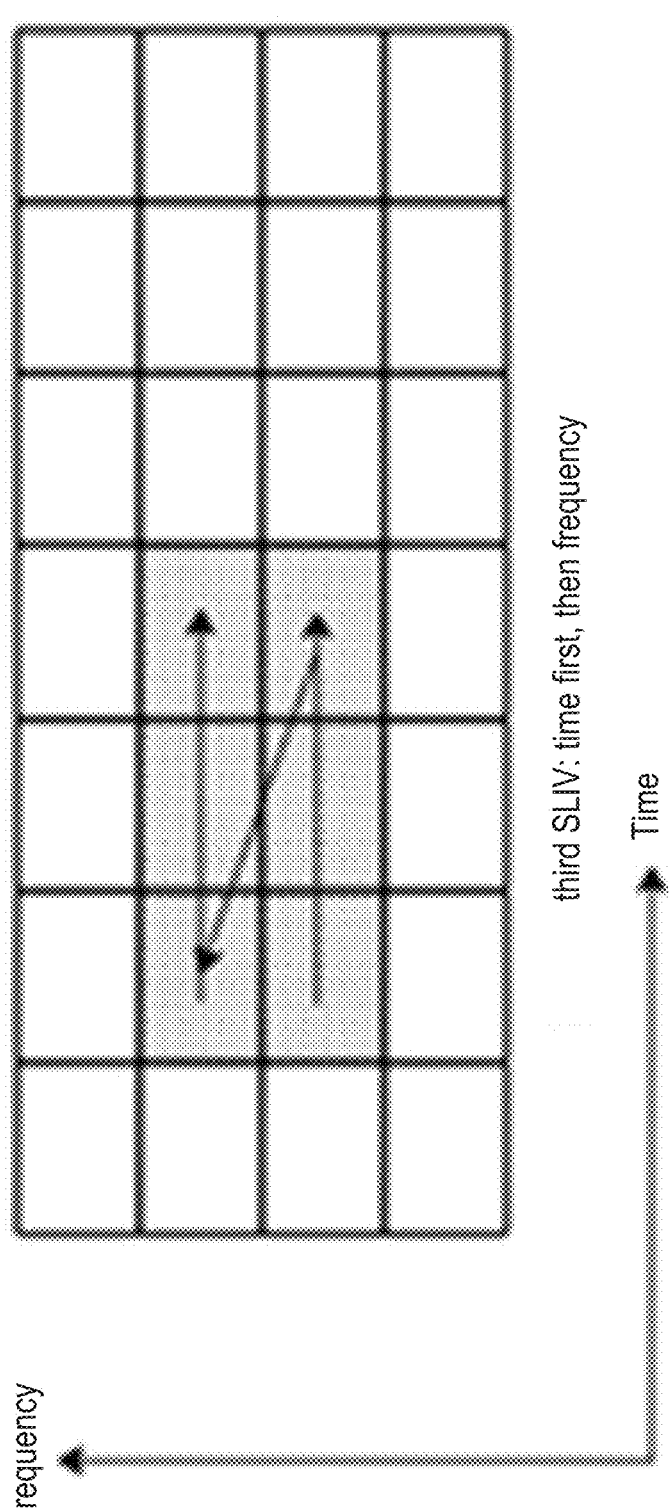
FIG. 10 shows yet another example for identifying resource units in a wireless transmission resource.

FIG. 9 shows an example for identifying the pre-empted resource by traversing the frequency first then time. FIG. 10 shows an example of identifying the preempted resource by traversing the time first then frequency. The patterns illustrated in FIG. 9 and FIG. 10 are merely examples and are not intended as limitations.
Type 3 Indication In some embodiments, the location information in time and/or frequency domain of the pre-empted resource may be determined by a predetermined pattern selected from a set of predetermined patterns. In some embodiments, the set of predetermined patterns may be configured by a higher layer parameter. The higher layer parameter includes at least one of a RRC parameter or a MAC CE. The update message may carry a pattern indicator or identifier to indicate the specific predetermined pattern.

For example, the update message may be a DCI and the pattern indicator may be included in an information field of the DCI. The value of the pattern indicator may be used as an index to identify an entry in the set of predetermined patterns. In some embodiments, the pattern indicator may be implemented in the form of a bit map, a SLIV, a RIV.

In some embodiments, the value of the pattern indicator may be used as an index to identify an entry in the set of predetermined patterns. This predetermined pattern could include patterns stretching time frequency resources across multiple component carrier (CC) or serving cells. Concretely, this modification could be done by changing the definition of field int-ConfigurationPerServingCell in TS 38.331 such as enriching the field into a field indicating the preemption information for the time frequency resource span across multiple CCs or adding a new field in RRC to indicate the preemption information to a number of cells in conjunction among the cells encapsulated in int-ConfigurationPerServingCell.

This new field could take the form of an RRC list encompassing typical cell combinations adapted to extended reality (XR) services. The parameter of positionInDCI would thus no longer be necessarily multiple of 14 as current TS38.331 describes yet rather impacted by the concrete cell combinations. The indication for no preemption (i.e. 14 bits all 0) or some default preemption bitmap pattern could be preconfigured and indicated, if needed, by some field in existing DCI or novel DCI format.

Correspondingly in DCI, some rearrangement of the DCI bits and the re-interpretation of the DCI payload from UE is expected. Specifically, some novel adjoint DCI could be used to deliver this information for a 126 bit payload.

56 bits and 28 bits may be used as granularity to indicate the preemption information (e.g. one of the preemption pattern out of the timeFrequencyset configured or preconfigured) for 4 cells and 2 cells respectively. 14 bits could be used to indicate the preemption information (e.g. one of the preemption pattern out of the timeFrequencyset configured or preconfigured) that may or may not associate with T-F resources spanning more than 1 CC. The breakdown of the total budget appears as following $$126=56+28*2+14$$

Correspondingly in DCI, some rearrangement of the DCI bits and the re-interpretation of the DCI payload from UE is expected. Specifically, some novel adjoint DCI could be used to deliver this information for a 126 bit payload.

14 bits are still used to indicate one of the preemption pattern out of the timeFrequencyset configured or preconfigured per cell as captured in TS 38.331. A reserved number of bits, e.g. 14 is used to indicate some additional pattern for preemption out of the timeFrequencyset configured or preconfigured that may or may not associate with T-F resources spanning more than 1 CC. The breakdown of the total budget appears as following:

$$112=14*8$$

The remaining (reserved) 14 bits are used to indicate some additional pattern for preemption out of the timeFrequencyset configured or preconfigured that may or may not associate with T-F resources spanning more than 1 CC.

The following related description in TS38.331 g20 is used for reference:

```
DownlinkPreemption ::=        SEQUENCE {
    int-RNTI                      RNTI-Value,
    timeFrequencySet              ENUMERATED {set0, set1},
    dci-PayloadSize               INTEGER (0..maxINT-DCI-PayloadSize),
    int-ConfigurationPerServingCell      SEQUENCE (SIZE
(1..maxNrofServingCells)) OF INT-ConfigurationPerServingCell,
    ...
}
INT-ConfigurationPerServingCell ::= SEQUENCE {
    servingCellId           ServCellIndex,
    positionInDCI           INTEGER (0..maxINT-DCI-PayloadSize-1)
}
```

As described above, there are various manner for indicating the location information of the pre-empted resource. The base station may choose at least one of these types of indications for the transmission resource update. The UE may be informed on which type of the indication is used by a higher layer signaling.

The above types of indications may be combined. For example, the frequency domain location may be indicated by an SLIV/RIV indicator, whereas the time domain location may be indicated by a bitmap. In another example, the frequency domain location may be indicated by a bitmap and the time domain location may be indicated by another or same bitmap. There is no limitation as to the manner in which the implementations above may be combined.

As described in section above, the reference resource may be configured with different granularities in the time domain and frequency domain.

The granularity of the reference resource in time domain may be determined by at least one of the following:

A higher layer parameter;

A number of portions of the reference resource in time domain;

A bit length of the bitmap of the update message; or

The duration of the reference resource in time domain.

The granularity of the reference resource in frequency domain may be determined by at least one of the following:

A higher layer parameter;

A number of portions of the reference resource in frequency domain;

The bit length of the bitmap of the update the message;

The range of the reference resource in frequency domain; or

A bandwidth of the active BWP.

In some embodiments, the duration of the pre-empted resource in time domain may be a multiple of slots or symbols of the one or more activated or associated serving cell. Optionally, the duration may not cross a boundary of a slot, mini slot, symbol, subframe, or a frame.

In some embodiments, the start or end of the pre-empted resource in time domain may align with the slot or symbol boundary of the one or more activated or associated serving cell. Optionally, the start or end of preempted resource in time domain may not cross a boundary of a slot, mini slot, symbol, subframe, or a frame.

In some embodiments, the range of the preempted resource in frequency domain may be a multiple of PRB or RE of the one or more activated or associated serving cell.

In some embodiments, the start or end of pre-empted resource in frequency domain may align with the RB or RE or CRB boundary of the one or more activated or associated serving cell. Optionally, the start or end of pre-empted resource in frequency domain may not cross a boundary of an RB, an RE, or a CRB.

In some implementations, the collision between data transmission occurs periodically or quasi-periodically, to reduce the resource overhead of the update message or reduce UE's energy of detecting the update message, the periodicity of the pre-empted resource can be defined.

In some implementations, the location information of the pre-empted resource could further include a time duration/window defined by higher layer or Li. Rate matching pattern used for pre-empting could be provided together with the time duration so that the victim UE consuming service with higher priority could either neglect the time frequency resources corresponding to the pattern or perform transmission or reception based on the rate matching pattern.

In some embodiments, the pre-empted resource may be determined by at least one of a periodicity, an offset, a duration, a start, or an end.

In some embodiments, at least one the periodicity, the offset, the duration, the start, or the end of the window of the pre-empted resource is determined by at least one of the following:

A higher layer parameter.

A periodicity of a search space set.

The search space set may be configured with the format of the DCI which carries the transmission resource update information.

The search space set may be configured with the format of the DCI which schedules the DL or UL transmission.

The search space set may be determined by the minimum or maximum periodicity of the search space sets from a search space set group.

Aperiodicity of a SPS transmission or a CG transmission
UE processing time of PDCCH, DL transmission, or UL
  transmission
A predefined value;
UE parameter such as UE capability;
Jittering of a data transmission;
Traffic pattern of a data transmission;
5QI, QoS, or QoE; or
A downlink control information.

In some implementations, at least one of the periodicity, offset, or duration of the pre-empted resource is dynamically indicated by a downlink control information.

The various embodiments described above disclose some more flexible schemes to indicate the location information of the pre-empted resource which further improve scheduling efficiency.

DCI Format and Content

As described above, the base station sends transmission resource update or transmission parameter update to the UE by using a message or via signaling. In some embodiments, the message may be a DCI. The DCI may further be a group common DCI, or a UE specific DCI. The DCI may be a previous defined DCI, or may be a newly introduced DCI.

Group Common DCI

In some embodiments, the DCI may include a first information block set which contains at least one first information block. In some embodiments, the first information block may carry the update information to transmission resource or transmission parameter. In some embodiments, the first information block may include at least one of the bitmap, the SLIV indicator, or the RIV indicator to indicate the pre-empted resource in frequency and/or time domain. In some embodiments, the first information block may include the transmission priority.

In some embodiments, the DCI may carry a configuration index, or a configuration group index.

In some embodiments, the DCI may carry a transmission priority.

In some embodiments, the transmission priority is a layer 1 or physical layer priority. In some embodiments, the transmission priority is associated with at least one of the 5QI, QoS, QoE, packet importance, or traffic type of the data transmission. In some embodiments, when the transmission priority associated with the update message is higher than the transmission priority of data transmission, the update is applicable to the data transmission.

In some embodiments, the transmission priority based on importance or 5QI of the packet/service could be in the DCI hereafter.

In some embodiments, the DCI may carry the granularity for the pre-empted resources.

In some embodiments, the DCI may carry a power control information. In some example, the power control information is used for adjusting the transmission power of the data transmission associated with the transmission resource or pre-empted resource.

In some embodiments, the DCI may carry jittering of a data transmission, or an offset associated with a data transmission. In some example, the offset determines the data arrival pattern.

In some embodiments, each first information block may be associated with at least one of a serving cell, or serving cell group, a UE group to which the UE belongs, a transmission priority, a configuration index, or a configuration group index.

In some embodiments, each first information block may indicate the information for at least one of a serving cell, or serving cell group, a UE group to which the UE belongs, a SPS configuration, a CG configuration, a CG configuration group, or a SPS configuration group.

In some embodiments, the configuration index is associated with SPS configuration or a configured grant configuration. In some implementations, the configuration group index is associated with a group of SPS configurations or a group of Configured grant configurations.

In some embodiments, the transmission priority is a priority of the update.

In some embodiments, the location information (or addressing information) of the first information block in the DCI may be determined by at least one of the following:
  Higher layer parameter;
  Bit length of one or more information block; or
  A second information block.

In some embodiments, the location information of the first information block in the DCI includes at least one of a start position, an end position, or a bit length of the first information block.

In some embodiments, the bit length of the first information block may be a multiple of 7 or 14. For example, the bit length of the first information block may be 7, 14, 21 28, 56, or, 70. In some embodiments, the bit length of the first information block is determined by a higher layer parameter. For example, if a pre-determined RRC parameter is not configured, the bit length of the first information block may be set to 14. The pre-empted resource may be determined by, for example, timeFrequencySet (as specified in 3GPP TS 38.213 g30). If a pre-determined RRC parameter is configured, the bit length of the first information block may be one of 7, 14, 21 28, 56, or, 70. Furthermore, the bit length of the first information block in this case may be determined by a higher layer parameter or the second information block. In some implementations, the pre-determined RRC parameter is associated with the indication of the pre-empted resource.

In some embodiments, the first information block indicate the update information or the pre-empted resource to multiple component carriers or serving cells. Concretely, this modification could be done by changing the definition of field int-ConfigurationPerServingCell as specified in TS 38.331 and enrich the field into a field indicating the preemption information for the T-F span across multiple CCs or adding a new field in RRC to indicate the number of cells in conjunction among the ConfigurationPerServingCell. This new field could take the form of an RRC list encompassing typical cell combinations adapted to XR services and positionInDCI would thus no longer be multiple of 14 yet rather impacted by the concrete cell combinations. The indication for no preemption or some default preemption could be preconfigured and indicated by some field in existing DCI or novel DCI format.

Correspondingly in DCI, some rearrangement of the DCI format and the re-interpretation of the DCI payload from UE is expected.

In some embodiments, the DCI is DCI format 2_1 or DCI format 2_4. In some example, the DCI is DCI format 2_1 for DL transmission. In some example, the DCI is DCI format 2_4 for UL transmission.

In some embodiments, the second information block may be referred as a separate information block. In some embodiments, the second information block may be carried in the same DCI carrying the first information block. For example, the second information block may be located at the beginning or end of the DCI. For another example, the location of the second information block may be determined by higher layer parameter. In some embodiments, as the location information of the first information block is indicated by the second information block which is conveyed by the same DCI with the first information block, the location of the second information block may be made known to UE by advance to assist UE to parse the information conveyed by DCI.

In some embodiments, the second information block may be carried in another DCI. The two DCIs may be different in at least one of the following:

DCI format;

DCI size;

RNTI that scrambles the CRC bits of the DCIs; or

Search space set associated with the DCIs.

UE Specific DCI

In some embodiments, the DCI format of the update DCI may include at least one of: DCI format 00, DCI format 01, DCI format 0_2, DCI format 1_0, DCI format 11, or DCI format 1_2.

The information field that carries the transmission resource or transmission parameter update information may be based on at least one of the following information fields when a predefined condition is met:

Frequency domain resource assignment;

Time domain resource assignment;

An indication of a specific time frequency pattern;

An indication of the granularity for the pre-empted resources;

Modulation and coding scheme;

Redundancy version;

New data indicator;

Antenna port;

DMRS sequence initialization;

Downlink assignment index;

Virtual resource block-to-PRB mapping;

PRB bundling size indicator; or

HARQ processing number.

In some embodiments, the predefined condition may include at least one of the following information fields being set to a pre-defined value (In some cases, the pre-defined values may be all zeros or all ones):

Frequency domain resource assignment;

Time domain resource assignment;

An indication of a specific time frequency pattern;

An indication of the granularity for the pre-empted resources;

Modulation and coding scheme;

Redundancy version;

New data indicator;

Antenna port;

DMRS sequence initialization;

Downlink assignment index;

Virtual resource block-to-PRB mapping;

PRB bundling size indicator; or

HARQ processing number.

In some embodiments, the DCI carrying the transmission resource or transmission parameter update information may have at least one of the following characteristics:

At least one information field of the DCI is the same as the DCI that schedules the corresponding DL or UL transmission. As an example, referring further to FIG. 2, DCI 402 is the DCI that schedules the DL or UL transmission and DCI 404 is the corresponding DCI carrying the update information. The at least one information field includes at least one of the following:

The HARQ process number; or

The Modulation and coding scheme.

The DCI is transmitted after the DCI that schedules the corresponding DL or UL transmission:

A first predefined symbol of the DCI that carries the update information is after a second predefined symbol of the DCI that schedules the DL or UL transmission. Optionally, the first predefined symbol or the second predefined symbol may be the first or last symbol of the respective DCI.

The DCI is before the scheduled DL or UL transmission:

A first predefined symbol of the DCI that carries the update information is before a third predefined symbol of the DL or UL transmission. Optionally, the first predefined symbol may be the first or last symbol of the DCI, and the third predefined symbol may be the first or last symbol of the DL or UL transmission.

With the embodiments disclosed above, the bit length of the information block conveying the update to the resource transmission is configurable, which provides the flexibility to the implementation. In another alternative, the indication of the update to resource transmission is conveyed by a UE-specific or scheduled DCI, which can simultaneously schedules another transmission resource for the DL or UL data. It provides the benefits of reducing scheduling latency and improving scheduling efficiency.

Monitoring Occasion for DCI

In some implementations, the number of monitoring occasions for the DCI carrying the update information can be limited to reduce UE power consumption.

In some embodiments, the PDCCH monitoring occasions for the DCI carrying the update information is confined within a window. In some embodiments, the window associated with the monitoring occasions for the DCI carrying the update information is determined by at least one of a periodicity, an offset, a start, an end, or a duration. In some embodiments, at least one the periodicity, the offset, the start, the end, or the duration of the window is determined by at least one of the following:

A higher layer parameter;

A periodicity of a search space set;

The search space set may be configured with the format of the DCI which carries the transmission resource update information.

The search space set may be configured with the format of the DCI which schedules the DL or UL transmission.

The search space set may be determined by the minimum or maximum periodicity of the search space sets from a search space set group.

Aperiodicity of a SPS transmission or a CG transmission;

UE processing time of PDCCH, or DL transmission, or UL transmission;

A predefined parameter;

UE parameter such as UE capability;

Jittering of a data transmission;

Traffic pattern of a data transmission;

5QI, QoS, or QoE; or

A downlink control information.

In some example, at least one of the periodicity, offset, or duration of the window is dynamically indicated by a downlink control information.

The periodicity of the search space set that configures the DCI carrying the transmission update information may be limited to a predefined range, or may be selected from candidate values.

The number of PDCCH monitoring occasions of the DCI carrying the update information with in the window may be limited to O. O is a positive integer. For example, O=1.

In some implementations, UE only monitors the first or last O PDCCH monitoring occasions within the window. In some embodiments, UE skips the remaining PDCCH monitoring occasions of the DCI carrying the update information within the window if the DCI is detected within the window. In some embodiments, UE skips the remaining PDCCH monitoring occasions of the DCI carrying the update information if the DCI is detected within the window.

In some embodiments, the window includes one or more periodicity of the search space set that configures the DCI.

In some implementations, the search space set that includes the DCI may be configured with a number of monitoring occasions less than or equal to O.

Update to Transmission Parameters

In some implementations, to schedule transmission resource more flexibly, transmission parameters associated with a transmission resource may be updated by the base station.

In some implementations, a plurality of transmission parameters for DL SPS transmission or UL CG transmission may be updated by the base station.

The transmission parameters may include at least one of:
Time domain resource allocation (TDRA) information;
Frequency domain resource allocation information;
Modulation and coding scheme (MCS);
Power control information;
Repetition factor;
Number of MIMO (Multiple Input Multiple Output) layers or antenna ports;
Dedicated demodulation reference signal (DMRS)-Configuration;
Frequency hopping information;
Precoding information; or
Location information of the update to the transmission resource (e.g., location information of a first information block)

In some implementations, a list of entries of the transmission parameter may be configured by a higher layer parameter. A DCI may carry an indicator to indicate one of the entries being selected. The UE may retrieve the updated parameter from the indicated entry.

For example, each entry may correspond to a configuration of the transmission parameter. A value i indicated by the DCI denotes the (i+1)-th (or the i-th) entry configured by the higher layer parameter. Table 1 shows an example list of parameter entries.

TABLE 1

| List of parameter entries |
| --- |
| 1st TDRA entry |
| 2nd TDRA entry |
| . . . |
| I-th TDRA entry |

In some implementations, one or more set of the transmission parameters may be configured by a higher layer parameter. The DCI may carry an indicator to indicate one of the set to be selected for the updated transmission parameters.

For example, each set may correspond to one or more transmission parameters. In this case, a value of i indicated by the DCI denotes the (i+1)-th (or the i-th) set configured by higher layer parameter. By providing a list of transmission parameters in a set, multiple transmission parameters may be updated simultaneously. Table 1 shows an example sets of parameters with each set including at least TDRA and MCS parameters. Each set corresponds to a TDRA and MCS configuration.

TABLE 2

| Sets of parameter entries |
| --- |
| 1st set of transmission parameters: TDRA-1, MCS-1, . . . |
| 2nd set of transmission parameters: TDRA-2, MCS-2, . . . |
| . . . |
| I-th set of transmission parameters: TDRA-I, MCS-I, . . . |

In some implementations, the update message includes a configuration index or a configuration group index. In some implementations, the configuration index is associated with SPS configuration or a Configured grant configuration. In some implementations, the configuration group index is associated with a group of SPS configurations or a group of Configured grant configurations.

In some implementations, the update to the transmission parameters may be effectuated or applied after a delay.

In some implementations, the delay may be determined by at least one of the following:
UE capability;
PDCCH/PDSCH/PUSCH processing time;
Sub-carrier spacing;
Predefined value; or
RRC parameter.

In some implementations, the delay may be defined by a reference sub-carrier spacing.

In some implementations, the commencement time of the delay may be determined by at least one of:
when a last symbol of the DCI is received;
when a last slot of the DCI is received;
when a last mini slot of the DCI is received;
when a last subframe of the DCI is received; or
when a last frame of the DCI is received In some implementations, the time domain resource allocation may include at least one of a start, an end, a periodicity, an offset, a duration of the time domain resource, or Start and length information of the data transmission. The offset may be an offset to a frame, subframe, slot, mini slot, or a symbol.

In some implementations, the periodicity is the transmission periodicity if the SPS transmission or CG transmission. In some embodiments, the offset is defined in relative to a system frame.

In some implementations, the frequency domain resource allocation information includes at least one of a starting position, or a number of resource blocks, granularity of the resource group.

In some implementations, the frequency hopping information includes at least one of a frequency hopping type, or a frequency hopping offset. In some embodiments, the frequency hopping type includes at least one of intra-slot hopping or inter-slot hopping.

In some implementations, the power control information includes at least one of a power transmission offset, a power control command.

In some implementations, the repetition factor determines the number of repetition times of the data transmission.

In some implementations, the UL or DL transmission associated with the transmission resource or the transmission parameters may have at least one of the following characteristics:

The UL or DL transmission is a downlink semi-persistent scheduling transmission;

The UL or DL transmission is an uplink configured grant transmission;

The UL or DL transmission is a periodic transmission or semi-persistent transmission; or The UL or DL transmission is impacted or based on the jittering effect of the services, wherein the jittering effect includes either or both of core network (CN) jittering or slice jittering due to the encoding processing of the file trace characteristics.

Embodiment 1

In this embodiment, the transmission resource update includes a pre-emption indication. The update message indicates a preempted resource. In some implementations, the preempted resource may be determined by a bitmap conveyed by the update message and a reference transmission resource. In this embodiment, the preempted resource is not used for DL or UL transmission.

The update message includes a DCI. The DCI includes at least a first information block set which contains at least one first information block. The at least one first information block carries the transmission resource update information. Each first information block may be associated with a serving cell of the UE, or a serving cell group of the UE.

In some implementations, the bit length of the first information block is a multiple of 7 or 14. For example, the bit length of the first information block may be 7, 14, 21, or 28. In some implementations, the bit length of the first information block may be determined by a higher layer parameter. In case a pre-determined RRC parameter is not configured, the bit length of the first information block may be set to 14. The preempted resource may be determined by timeFrequencySet. If a pre-determined RRC parameter is configured, the bit length of the first information block may be one of 7, 14, 21, or 28. Furthermore, the bit length of the first information block in this case may be determined by a higher layer parameter or the second information block. In some cases, the pre-determined RRC parameter may be associated with the indication of the preempted resource.

In some implementations, the least significant M bits of the bitmap indicate the preempted resource in time domain, the most significant N bits of the bitmap indicate the preempted resource in frequency domain. In some other implementations, the most significant M bits of the bitmap indicate the preempted resource in time domain, the least significant N bits of the bitmap indicate the preempted resource in frequency domain.

In some implementations, the location information (e.g., including at least one of a start position, end position, bit length) of the first information block may be determined by a second information block. In this implementations, the location information of the first information may be dynamically updated, which provides more flexibility to the indication of the preempted resource.

In some implementations, the reference transmission resource in time domain is determined by a duration prior to the detection occasion of the update message. In this embodiments, the duration is determined by a periodicity of the search space set which is configured with the DCI conveying the update message.

In some implementations, the reference transmission resource in frequency domain is determined by the active DL BWP where the DCI conveying the update message is detected or by higher layer parameter.

In some implementations, the granularity of the reference transmission resource in time and/or frequency domain is determined by a pre-determined RRC parameter and/or a RRC parameter timeFrequencySet. For example, if a pre-determined RRC parameter is not configured, the granularity of the reference transmission resource in time and/or frequency domain is determined by RRC parameter timeFrequencySet. If the pre-determined RRC parameter is configured, the granularity of the reference transmission resource in time and/or frequency domain is determined by the pre-determined RRC parameter. In some embodiments, the pre-determined RRC parameter is associated with the reference transmission resource in frequency domain.

Embodiment 2

In this embodiment, the transmission resource update includes a pre-emption indication. The update message includes indicating a preempted resource. In some embodiments, the preempted resource is determined by a bitmap and/or a SLIV indicator conveyed by the update message and a reference transmission resource. In this embodiments, the preempted resource is not used for DL or UL transmission.

In this embodiments, the update message is a DCI. The DCI includes at least a first information block set which contains at least one first information block. The first information block carries the transmission resource update information. Each first information block may be associated with a serving cell, or a serving cell group.

In some implementations, the bit length of the first information block is a multiple of 7 or 14. For example, the bit length of the first information block may be 7, 14, 21, or 28. In some implementations, the bit length of the first information block is determined by a higher layer parameter. In case a pre-determined RRC parameter is not configured, the bit length of the first information block may be set to 14. The preempted resource may be determined by timeFrequencySet. If a pre-determined RRC parameter is configured, the bit length of the first information block may be one of 7, 14, 21, or 28. Furthermore, the bit length of the first information block in this case may be determined by a higher layer parameter or a second information block. In some implementations, the pre-determined RRC parameter may be associated with the indication of the preempted resource.

In some implementations, the least significant M bits of the first information block indicate the preempted resource in time domain, the most significant N bits of the first information block indicate the preempted resource in frequency domain. In some implementations, the most significant M bits of the first information block indicate the preempted resource in time domain, and the least significant N bits of the first information block indicate the preempted resource in frequency domain. In some implementations, the M bits of the first information block comprise a bitmap. In some implementations, the N bits of the first information block may be an SLIV or RIV indicator.

In some implementations, the location information (for example, including at least one of a start position, end position, bit length) of the first information block may be determined by a second information block. In some implementations, the location information of the first information may be dynamically updated, which provides more flexibility to the indication of the preempted resource.

In some implementations, the reference transmission resource in time domain may be determined by a duration prior to the detection occasion of the update message. The duration may be determined by a periodicity of the search space set which is configured with the DCI conveying the update message.

In some implementations, the reference transmission resource in frequency domain is determined by the active DL BWP where the DCI conveying the update message is detected or by a higher layer parameter.

In some implementations, the granularity of the reference transmission resource in time and/or frequency domain may be determined by a pre-determined RRC parameter and/or a RRC parameter timeFrequencySet. For example, if a pre-determined RRC parameter is not configured, the granularity of the reference transmission resource in time and/or frequency domain may be determined by RRC parameter timeFrequencySet. If the pre-determined RRC parameter is configured, the granularity of the reference transmission resource in time and/or frequency domain may be determined by the pre-determined RRC parameter. In some implementations, the pre-determined RRC parameter may be associated with the reference transmission resource in frequency domain.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method performed by a wireless terminal in a wireless network, comprising:

receiving a message from a wireless communication node of the wireless network, the message indicating an update to a wireless resource or a transmission parameter associated with the wireless resource, the wireless resource being previously allocated to the wireless terminal for data reception or data transmission;

determining a type of the update among a plurality of types, wherein the plurality of types of updates comprises:

the wireless resource, or a downlink transmission associated with the wireless resource, or an uplink transmission associated with the wireless resource being canceled;

the wireless resource being partially pre-empted;

a transmission power of the uplink transmission associated with the wireless resource being adjusted; and a transmission parameter associated with the wireless resource being updated;

parsing the message based on a the determined type of the update to the wireless resource or the transmission parameter associated with the wireless resource to obtain the update;

determining whether to apply the update to the wireless resource or the transmission parameter based on one or more transmission characteristics of a downlink (DL) transmission or uplink (UL) transmission, wherein the update is not applied based on the one or more transmission characteristics comprising that the DL transmission or the UL transmission includes hybrid automatic repeat request acknowledgement (HARQ-ACK) information or has a given radio network temporary identifier (RNTI); and transmitting or receiving data, or skipping transmitting or receiving data, using the wireless resource based on the update and the determination as to whether or not to apply the update.

2. The method of claim 1, wherein the wireless resource or the transmission parameter associated with the wireless resource is configured by at least one of:

a downlink (DL) dynamic assignment;

a DL semi-persistent scheduling (SPS);
an uplink (UL) configured grant;
a UL dynamic grant; or
a higher layer parameter.

3. The method of claim 1, wherein the transmission parameter comprises at least one of:
a time domain resource allocation information;
a frequency domain resource allocation information;
a modulation and coding scheme;
a power control information;
a repetition factor;
a number of Multiple Input Multiple Output layers or antenna ports;
a demodulation reference signal configuration;
a frequency hopping information;
a precoding information; or
a location information of the type of the update.

4. The method of claim 1, wherein determining the type of the update among the plurality of types comprises determining the type based on:
a higher layer parameter;
a capability parameter of the wireless terminal;
an assistance information from the wireless terminal; or
a format of a DCI conveying the update.

5. The method of claim 1, wherein the message comprises a downlink control information (DCI) or a MAC Control Element (MAC CE).

6. The method of claim 5, wherein:
the type of the update indicates the wireless resource or a downlink transmission associated with the wireless resource, or the uplink transmission associated with the wireless resource as being canceled; and the method further comprises avoiding using the wireless resource for downlink reception or uplink transmission.

7. The method of claim 5, wherein:
the type of the update indicates the wireless resource as being partially pre-empted; and
the method further comprises determining a pre-empted wireless resource among the wireless resource based on the update.

8. The method of claim 7, further comprising:
avoiding using the pre-empted wireless resource for data transmission or data reception;
determining the wireless resource associated with pre-empted wireless resource, or the downlink transmission associated with the pre-empted wireless resource, or the uplink transmission associated with the pre-empted wireless resource as being canceled; or
adjusting the transmission power of an uplink transmission associated with the pre-empted wireless resource.

9. The method of claim 8, wherein avoiding using the pre-empted wireless resource comprises:
calculating a transport block size for downlink reception or an uplink transmission by removing the pre-empted wireless resource from the wireless resource; and
performing the downlink reception or the uplink transmission based on the transport block size.

10. The method of claim 7, wherein determining the pre-empted wireless resource comprises:
determining the pre-empted wireless resource based on a reference wireless resource, wherein the reference wireless resource comprises M*N resource units formed by M divisions in time domain and N divisions in frequency domain, M and N being non-negative integers, and wherein the pre-empted wireless resource comprises a subset of the M*N resource units of the reference wireless resource.

11. A computer program product comprising a non-transitory computer-readable program medium with computer code stored thereupon, the computer code, when executed by one or more processors, causing the one or more processors to implement a method claim 1.

12. A method performed by a wireless communication node in a wireless network, comprising:
sending a configuration message comprising information associated with a wireless resource to a wireless terminal in the wireless network, the information being associated with data reception or data transmission by the wireless terminal; and
composing a message indicating an update to the wireless resource or a transmission parameter associated with the wireless resource based on a type of the update, the message being configured to cause the wireless terminal to determine the type of the update among a plurality of types prior to parsing the message, the update instructing the wireless terminal to transmit or receive data or to skip transmitting or receiving data using the wireless resource based on the update,
wherein the plurality of types of the update comprises:
the wireless resource, or a downlink transmission associated with the wireless resource, or an uplink transmission associated with the wireless resource being canceled;
the wireless resource being partially pre-empted;
a transmission power of the uplink transmission associated with the wireless resource being adjusted; and
a transmission parameter associated with the wireless resource being updated;
wherein the wireless terminal is configured to determine whether to apply the update to the wireless resource or the transmission parameter based on one or more transmission characteristics of a downlink (DL) transmission or uplink (UL) transmission, and wherein the update is not applied based on the one or more transmission characteristics comprising that the DL transmission or the UL transmission includes hybrid automatic repeat request acknowledgement (HARQ-ACK) information or has a given radio network temporary identifier (RNTI).

13. The method of claim 12, wherein:
the type of the update indicates the wireless resource as being partially pre-empted; and
indicating a pre-empted wireless resource among the wireless resource in the update.

14. The method of claim 13, wherein indicating the pre-empted wireless resource comprises:
indicating in the update the pre-empted wireless resource based on a reference wireless resource, wherein the reference wireless resource comprises M*N resource units formed by M divisions in time domain and N divisions in frequency domain, M and N being non-negative integers, and wherein the pre-empted wireless resource comprises a subset of the M*N resource units of the reference wireless resource.

15. A device comprising a memory for storing computer instructions and a processor in communication with the memory, wherein the processor, when executing the computer instructions, is configured to implement a method of claim 12.

16. A computer program product comprising a non-transitory computer-readable program medium with computer code stored thereupon, the computer code, when executed by one or more processors, causing the one or more processors to implement a method of claim 12.

17. A device for wireless communication, the device comprising a memory for storing computer instructions and a processor in communication with the memory, wherein, when the processor executes the computer instructions, the processor is configured to cause the device to:

receive a message from a wireless communication node, the message indicating an update to a wireless resource or a transmission parameter associated with the wireless resource, the wireless resource being previously allocated to the device for data reception or data transmission;

determining a type of the update among a plurality of types, wherein the plurality of types of updates comprises:

the wireless resource, or a downlink transmission associated with the wireless resource, or an uplink transmission associated with the wireless resource being canceled;

the wireless resource being partially pre-empted;

a transmission power of the uplink transmission associated with the wireless resource being adjusted; and a transmission parameter associated with the wireless resource being updated;

parse the message based on the determined type of the update to the wireless resource or the transmission parameter associated with the wireless resource to obtain the update; and determining whether to apply the update to the wireless resource or the transmission parameter based on one or more transmission characteristics of a downlink (DL) transmission or uplink (UL) transmission, wherein the update is not applied based on the one or more transmission characteristics comprising that the DL transmission or the UL transmission includes hybrid automatic repeat request acknowledgement (HARQ-ACK) information or has a given radio network temporary identifier (RNTI); and transmit or receive data, or skip transmitting or receiving data, using the wireless resource based on the update and the determination as to whether or not to apply the update.

\* \* \* \* \*